United States Patent
Kajita et al.

(10) Patent No.: US 10,415,562 B2
(45) Date of Patent: Sep. 17, 2019

(54) AUTOMATED OPERATION OF WELLSITE PUMPING EQUIPMENT

(71) Applicant: SCHLUMBERGER TECHNOLOGY CORPORATION, Sugar Land, TX (US)

(72) Inventors: Marcos Kajita, Houston, TX (US); Miguel Angel Lopez, Sugar Land, TX (US); Hassanain A. Jwair, Houston, TX (US); Manuel Alfonso Bobadilla Larios, Stafford, TX (US); Edwin Guy Faught, Argyle, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 16/063,329

(22) PCT Filed: Dec. 19, 2016

(86) PCT No.: PCT/US2016/067602
§ 371 (c)(1),
(2) Date: Jun. 18, 2018

(87) PCT Pub. No.: WO2017/106865
PCT Pub. Date: Jun. 22, 2017

(65) Prior Publication Data
US 2018/0363640 A1 Dec. 20, 2018

Related U.S. Application Data

(60) Provisional application No. 62/269,947, filed on Dec. 19, 2015.

(51) Int. Cl.
*F04B 49/10* (2006.01)
*E21B 43/12* (2006.01)
(Continued)

(52) U.S. Cl.
CPC ............ *F04B 49/106* (2013.01); *E21B 43/12* (2013.01); *E21B 44/00* (2013.01); *F04B 47/00* (2013.01);
(Continued)

(58) Field of Classification Search
CPC ........ F04B 49/106; F04B 49/08; F04B 49/06; F04B 47/02; F04B 47/00; F04B 49/065; E21B 44/00; E21B 43/12; G05B 19/04
See application file for complete search history.

(56) References Cited

U.S. PATENT DOCUMENTS 4,108,574 A * 8/1978 Bartley ..................... G01F 1/00
417/19
5,240,380 A * 8/1993 Mabe .................. F04D 15/0066
417/43
(Continued)

FOREIGN PATENT DOCUMENTS

WO 2015070913 A1 5/2015

OTHER PUBLICATIONS

International Search Report and Written Opinion issued in International Patent Application No. PCT/US2016/067602 dated Apr. 14, 2017; 13 pages.

*Primary Examiner* — Christopher E. Everett

(57) ABSTRACT

Automated operation of well site pumping equipment, including generating a mathematical belief model for maintaining an interrelationship between flow rate achievable by a pump unit discharge pressure of the pump unit, and probability of achieving the flow rate at corresponding discharge pressure. Speed of the pump unit is controlled to achieve a target speed based on a flow rate set-point and the mathematical belief model and updating the mathematical belief model at least while the target speed is achieved. Updating the mathematical belief model may include increasing the probability of achieving the flow rate set-
(Continued)

point when actual flow rate of the pump unit is not less than the flow rate set-point and decreasing the probability of achieving the flow rate set-point when the actual flow rate of the pump unit is less than the flow rate set-point.

25 Claims, 10 Drawing Sheets

(51) Int. Cl.
   *F04B 47/00* (2006.01)
   *F04B 47/02* (2006.01)
   *F04B 49/06* (2006.01)
   *F04B 49/08* (2006.01)
   *G05B 19/04* (2006.01)
   *E21B 44/00* (2006.01)
   *G05B 19/042* (2006.01)

(52) U.S. Cl.
   CPC ............. *F04B 47/02* (2013.01); *F04B 49/06* (2013.01); *F04B 49/065* (2013.01); *F04B 49/08* (2013.01); *G05B 19/04* (2013.01); *G05B 19/042* (2013.01); *G05B 2219/41108* (2013.01)

(56) References Cited

U.S. PATENT DOCUMENTS

| | | | |
|---|---|---|---|
| 5,941,305 A | 8/1999 | Thrasher et al. | |
| 10,138,882 B1* | 11/2018 | Self | F04B 49/065 |
| 2004/0064292 A1 | 4/2004 | Beck et al. | |
| 2004/0267395 A1* | 12/2004 | Discenzo | G05B 13/024 |
| | | | 700/99 |
| 2010/0200224 A1 | 8/2010 | Toguem Nguete et al. | |
| 2010/0211423 A1* | 8/2010 | Hehmeyer | E21B 44/00 |
| | | | 702/6 |
| 2011/0146984 A1 | 6/2011 | Krush | |
| 2013/0287596 A1* | 10/2013 | Geneau | F04D 15/0022 |
| | | | 417/44.1 |
| 2015/0148919 A1* | 5/2015 | Watson | G06N 7/005 |
| | | | 700/31 |
| 2016/0076549 A1* | 3/2016 | Kelly | F04D 15/0066 |
| | | | 700/282 |
| 2016/0312552 A1* | 10/2016 | Early | G05B 13/041 |
| 2017/0177761 A1* | 6/2017 | Early | E21B 41/0092 |
| 2017/0198699 A1* | 7/2017 | Laue | G01F 5/005 |
| 2017/0328154 A1* | 11/2017 | Song | E21B 21/08 |

\* cited by examiner

AUTOMATED OPERATION OF WELLSITE PUMPING EQUIPMENT

CROSS-REFERENCE TO RELATED APPLICATIONS

This application claims priority to and the benefit of U.S. Provisional Application No. 62/269,947, titled "Adaptive, Learning-Based Approach for Pump Rate Control Automation," filed Dec. 19, 2015, the entire disclosure of which is hereby incorporated herein by reference.

BACKGROUND OF THE DISCLOSURE

High-volume, high-pressure pumps are utilized at wellsites for a variety of pumping operations. Such operations may include drilling, cementing, acidizing, water jet cutting, hydraulic fracturing, and other wellsites operations. In some pumping operations, several pumps may be fluidly connected to a well via various fluid conduits and/or a manifold. During such operations, the fluid conduits and/or the manifold distributes low-pressure fluid from a mixer, a blender, and/or other sources among the pumps and combines pressurized fluid from the pumps for injection into the well.

Success of the pumping operations at a wellsites may be affected by marry factors, including efficiency, failure rates, and safety related to operation of the pumps. Systematic high fluid pressures, flow rates, and vibrations generated by the pumps may cause mechanical fatigue, wear, and other damage to the pumps, which may decrease pumping flow rates and efficiency.

To ensure that the pumps produce the intended flow rates or otherwise operate as intended, human operators at the wellsite may manually control or adjust operation of each pump and the associated transmission during downhole pumping operations and/or perform pressure and flow rate calibrations, diagnostics, and other tests before commencing such downhole pumping operations. To perform tests and to oversee the actual downhole pumping operations, the operators typically approach the pumps to visually inspect the fluid sensors and to manually adjust the pumps, thus exposing themselves to a potentially dangerous environment. Approaching the pumps during testing or pumping operations may be dangerous, such as because high-pressure fluid within the pumps may escape, which may lead to serious injuries. Also, performing the testing and pumping operations manually may result in inconsistent pump settings and, thus, inconsistent pump performance.

Furthermore, automated control of pumps using gear and throttle control is difficult, as the pumps may be constructed using different components and may have experienced different levels of wear and tear. For example, different fracturing pump components (e.g., the engine, the transmission, the power end, the fluid end, etc.) may have different parameters and capabilities. Therefore, a same "operation set-point" (i.e., gear and throttle set-point pair) may result in a different output flow rates for different pumps in addition, different wear levels of different pump components increase the variability in operating the pumps to achieve a target flow rate.

Automated monitoring of pump parameters is another challenge associated with pump operation. External factors such as, but not limited to, pressure response from the well may invalidate previously made decisions and necessitate the operator to alter the engine speed (e.g., throttle) and transmission (i.e., gear) set-points to prevent damage to the pump unit, to achieve the intended rate in a different way, or to adjust the intended flow rate because it is no longer achievable.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus including a controller having a processor and a memory including computer program code. The controller is operable to automatically control flow rate discharged by a pump unit by controlling speed of the pump unit to achieve a target speed based on a flow rate set-point and an interrelationship. The interrelationship is between flow rate achievable by the pump unit, discharge pressure of the pump unit, and probability of achieving the flow rate at a corresponding discharge pressure. The controller is also operable to automatically control flow rate discharged by the pump unit by, at least while the target speed is achieved, increasing the probability of achieving the flow rate set-point when actual flow rate of the pump unit is not less than the flow rate set-point, and decreasing the probability of achieving the flow rate set-point when the actual flow rate of the pump unit is less than the flow rate set-point.

The present disclosure also introduces a method that includes generating a mathematical belief model for maintaining an interrelationship between flow rate achievable by a pump unit, discharge pressure of the pump unit, and probability of achieving the flow rate at a corresponding discharge pressure. The method also includes operating a controller comprising a processor and a memory including computer program code to automatically control flow rate discharged by the pump unit. The automatic flow rate control includes controlling speed of the pump unit to achieve a target speed based on a flow rate set-point and the mathematical belief model. The automatic flow rate control also includes updating the mathematical belief model, at least while the target speed is achieved, by increasing the probability of achieving the flow rate set-point when actual flow rate of the pump unit is not less than the flow rate set-point, and decreasing the probability of achieving the flow rate set-point when the actual flow rate of the pump unit is less than the flow rate set-point.

The present disclosure also introduces a method that includes generating a mathematical model for a pump unit defining a relationship between a flow rate that is achievable by the pump unit at a corresponding discharge pressure and a probability of achieving the flow rate at the corresponding discharge pressure. The method also includes inputting a target flow rate into a controller comprising a processor and a memory including computer program code. The method also includes operating the controller to automatically control flow rate of the pump unit by automatically selecting a target pump unit speed corresponding to the target flow rate, adjusting speed of the pump unit until the target pump unit speed is achieved, recording actual flow rate and actual discharge pressure of the pump unit, and updating the mathematical model. Updating the mathematical model includes increasing the probability of achieving the target flow rate by the pump unit if the recorded actual flow rate is not less than the target flow rate, and decreasing the probability of achieving the target flow rate by the pump unit if the recorded actual flow rate is less than the target flow rate.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
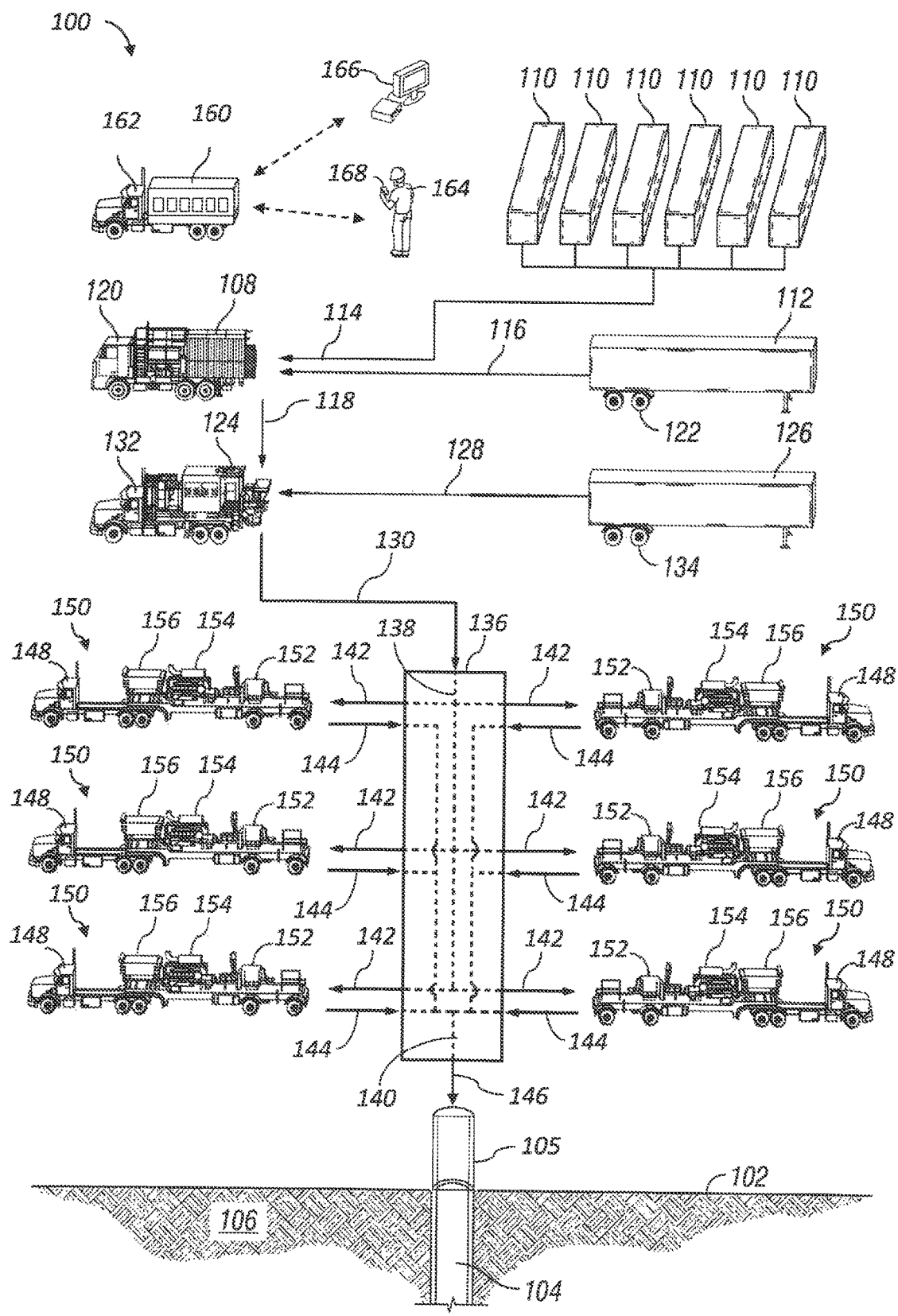
FIG. 1 is a schematic view of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

FIG. 1 is a schematic view of at least a portion of an example environment in which a control system according to one or more aspects of the present disclosure may be utilized. The figure shows a wellsite 102, a wellbore 104 extending from the terrain surface of the wellsite 102, a partial sectional view of a subterranean formation 106 penetrated by the wellbore 104, and a wellhead 108, as well as a wellsite system 100 comprising various pieces of equipment or components located at the wellsite 102. The wellsite system 100 may be operable to transfer various materials and additives from corresponding sources to a destination location for blending or mixing and eventual injection into the wellbore 104 during fracturing operations.

The wellsite system 100 may comprise a mixing unit 108 (referred to hereinafter as a "mixer") fluidly connected with one or more tanks 110 and a container 112. The container 112 may contain a first material and the tanks 110 may contain a liquid. The first material may be or comprise a hydratable material or gelling agent, such as guar, polymers, synthetic polymers, galactomannan, polysaccharides, cellulose, and/or clay, among other examples. The liquid may be or comprise an aqueous fluid, such as water or an aqueous solution comprising water, among other examples. The mixer 108 may be operable to receive the first material and the liquid, via two or more conduits or other material transfer means (hereafter simply "conduits") 114, 116, and mix or otherwise combine the first material and the liquid to form a base fluid, which may be or comprise that which is known in the art as a gel. The mixer 108 may then discharge the base fluid via one or more fluid conduits 118.

The wellsite system 100 may further comprise a mixer 124 fluidly connected with the mixer 108 and a container 126. The container 126 may contain a second material that may be substantially different than the first material. For example, the second material may be or comprise a proppant material, such as sand, sand-like particles, silica, quartz, and/or propping agents, among other examples. The mixer 124 may be operable to receive the base fluid from the mixer 108 via one or more fluid conduits 118, and the second material from the container 126 via one or more fluid conduits 128, and mix or otherwise combine the base fluid and the second material to form a mixture. The mixture may be or comprise that which is known in the art as a fracturing fluid. The mixer 124 may then discharge the mixture via one or more fluid conduits 130.

The mixture may be communicated from the mixer 124 to a common manifold 136 via the one or more fluid conduits 130. The common manifold 136 may comprise various valves and diverters, as well as a suction line 138 and a discharge line 140, such as may be collectively operable to direct the flow of the mixture in a selected or predetermined manner. The common manifold 136, which may be known in the art as a missile or a missile trailer, may distribute the mixture to a fleet of pump units 150. Although the fleet is shown comprising six pump units 150, the fleet may comprise other quantities of pump units 150 within the scope of the present disclosure.

Each pump unit 150 may comprise a pump 152, a prime mover 154, and perhaps a heat exchanger 156. Each pump unit 150 may receive the mixture from the suction line 138 of the common manifold 136, via one or more fluid conduits 142, and discharge the mixture under pressure to the discharge line 140 of the common manifold 136, via one or more fluid conduits 144. The mixture may then be discharged from the common manifold 136 into the wellbore 104 via one or more fluid conduits 146, the wellhead 105, and perhaps various additional valves, conduits, and/or other hydraulic circuitry fluidly connected between the common manifold 136 and the wellbore 104.

The wellsite system 100 may also comprise a control center 160 may be or comprise a controller, such as may be operable to provide control to one or more portions of the wellsite system 100 and/or operable to monitor health and functionality of one or more portions of the wellsite system 100. For example, the control center 160 may be operable to monitor and control one or more portions of the mixers 108, 124, the pump units 150, the common manifold 136, and various other pumps, conveyers, and/or other wellsite equipment (not shown) disposed along the conduits 114, 116, 118, 128, 130, such as may be operable to move, mix, separate, or measure the fluids, materials, and/or mixtures described above and inject such fluids, materials, and/or mixtures into the wellbore 104. Communication between the control center 160 and the various portions of the wellsite system 100 may be via wired and/or wireless communication means. However, for clarity and ease of understanding, such communication means are not depicted in FIG. 1, and a person having ordinary skill in the art will appreciate that such communication means are within the scope of the present disclosure.

One or more of the containers 112, 126, the mixers 108, 124, the pump units 150, and the control center 160 may each be disposed on corresponding trucks, trailers, and/or other mobile carriers 122, 134, 120, 132, 148, 162, respectively, such as may permit their transportation to the wellsite surface 102. However, one or more of the containers 112, 126, the mixers 108, 124, the pump units 150, and the control center 160 may each be skidded or otherwise stationary, and/or may be temporarily or permanently installed at the wellsite surface 102.

A field engineer, equipment operator, or field operator 164 (collectively referred to hereinafter as a "wellsite operator") may operate one or more components, portions, or systems of the wellsite equipment and/or perform maintenance or repair on the wellsite equipment. For example, the wellsite operator 164 may assemble the wellsite system 100, operate the wellsite equipment to perform the fracturing operations, check equipment operating parameters, and repair or replace malfunctioning or inoperable wellsite equipment, among other operational, maintenance, and repair tasks, collectively referred to hereinafter as wellsite operations. The wellsite operator 164 may perform wellsite operations by himself or with other wellsite operators. During wellsite operations, the wellsite operator 164 may communicate instructions to the other operators via a human machine interface (HMI) 166 and/or a communication device 168. The wellsite operator 164 may also communicate control signals or other information to the control center 160 via the HMI 166 or the communication device 168 during and/or before the wellsite operations. The wellsite operator 164 may also control one or more components, portions, or systems of the wellsite system 100 from the control center 160 or via the HMI 166 or the communication device 168.

FIG. 1 depicts the wellsite system 100 as being operable to transfer additives and produce mixtures that may be pressurized and injected into the wellbore 104 during hydraulic fracturing operations. However, it is to be understood that the wellsite system 100 may be operable to transfer other additives and produce other mixtures that may be pressurized and injected into the wellbore 104 during other oilfield operations, such as cementing, acidizing, chemical injecting, and/or water jet cutting operations, among other examples. Accordingly, unless described otherwise, the one or more fluids being pumped by the pump unit 200, may be referred to hereinafter simply as "a fluid."

Figure 2:
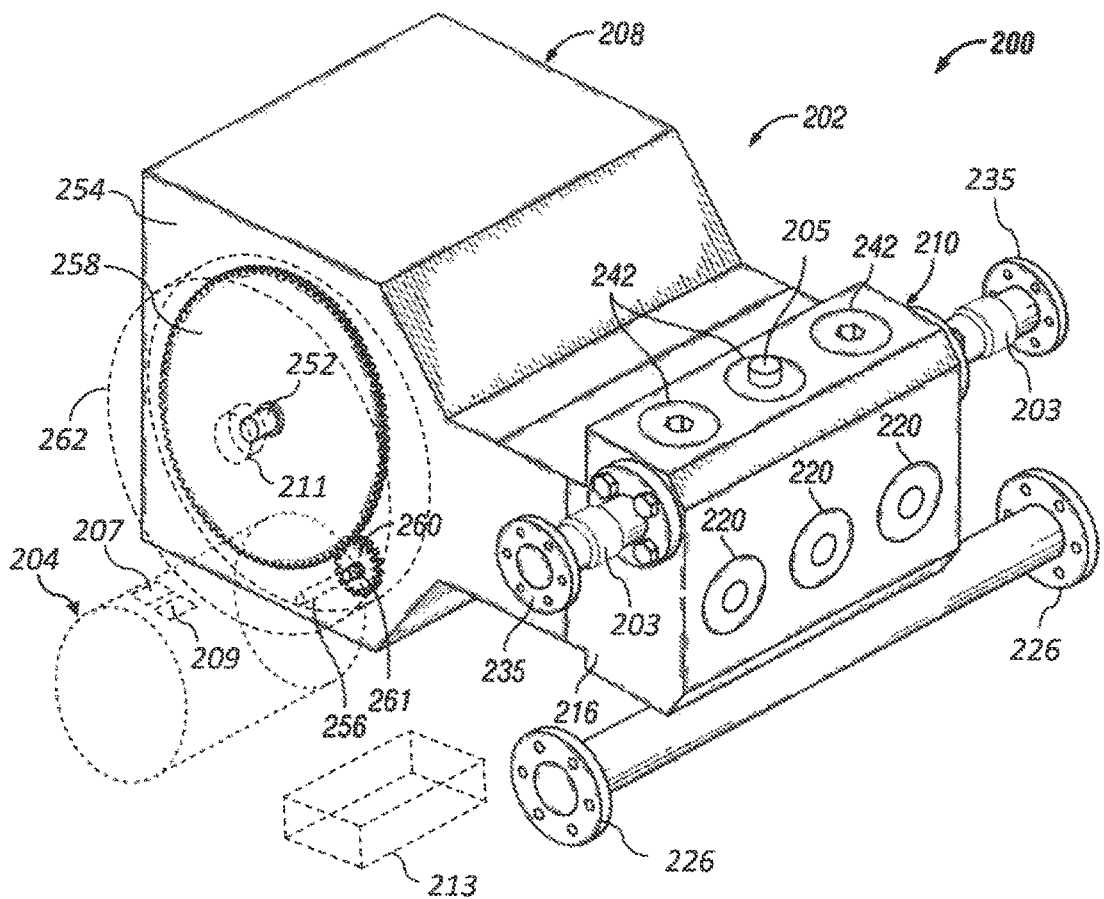
FIG. 2 is a schematic perspective view of a portion of an example implementation of the apparatus shown in FIG. 1 according to one or more aspects of the present disclosure.
Figure 3:
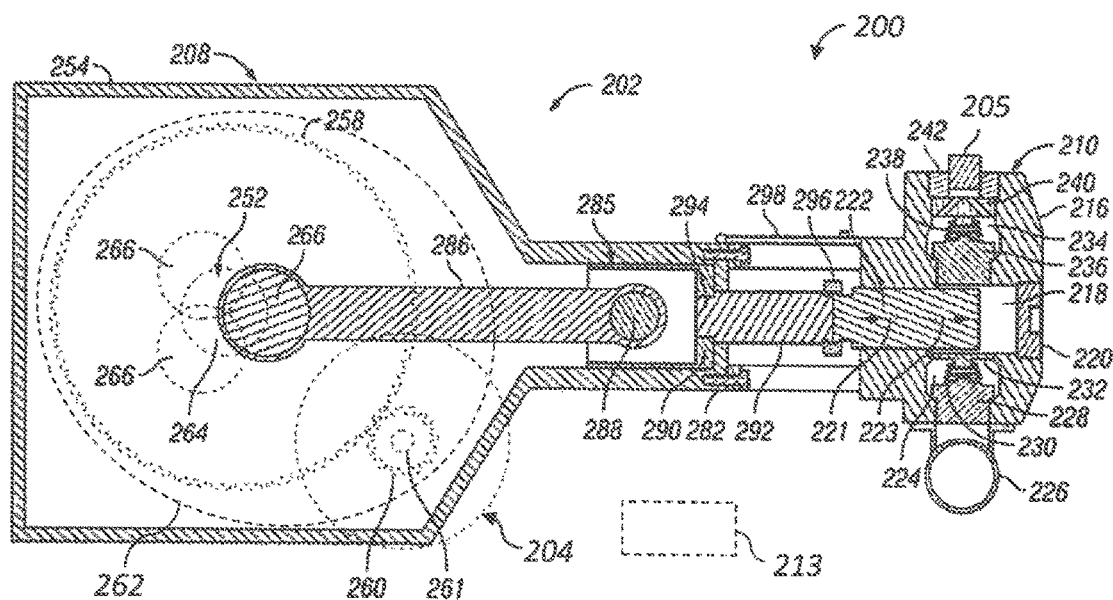
FIG. 3 is a schematic sectional view of a portion of an example implementation of the apparatus shown in FIG. 2 according to one or more aspects of the present disclosure.

FIG. 2 is a perspective schematic view of a portion of an example implementation of at least a portion of an instance of the pump units 150 shown in FIG. 1 according to one or more aspects of the present disclosure, and designated in FIG. 2 by reference numeral 200. FIG. 3 is a side sectional view of a portion of the pump unit 200 shown in FIG. 2. Portions of the pump unit 200 shown in FIGS. 2 and 3 are shown in phantom lines, such as to prevent obstruction from view of other portions of the pump unit 200. The following description refers to FIGS. 1-3, collectively.

The pump unit 200 comprises a pump 202 operatively coupled with and actuated by a prime mover 204. The pump 202 includes a power section 208 and a fluid section 210. The fluid section 210 may comprise a pump housing 216 having a plurality of fluid chambers 218. One end of each fluid chamber 218 may be plugged by a cover plate 220, such as may be threadedly engaged with the pump housing 216 while an opposite end of each fluid chamber 218 may contain a reciprocating member 222 slidably disposed therein and operable to displace the fluid within the corresponding fluid chamber 218. Although the reciprocating member 222 is depicted as a plunger, the reciprocating member 222 may also be implemented as a piston, diaphragm, or another reciprocating fluid displacing member.

Each fluid chamber 218 is fluidly connected with a corresponding one of a plurality of fluid inlet cavities 224 each adapted for communicating fluid from fluid inlets 226 into a corresponding fluid chamber 218. The fluid inlets 226 may be in fluid communication with a corresponding conduit 142. Each fluid inlet cavity 224 may contain an inlet valve 228 operable to control fluid flow from the fluid inlets 226 into the fluid chamber 218. Each inlet valve 228 may be biased toward a closed flow position by a first spring or another biasing member 230, which may be held in place by an inlet valve stop 232. Each inlet valve 228 may be actuated to an open flow position by a selected or predetermined differential pressure between the corresponding fluid inlet cavity 224 and the fluid inlets 226.

Each fluid chamber 218 is also fluidly connected with a fluid outlet cavity 234 extending through the pump housing 216 transverse to the reciprocating members 222. The fluid outlet cavity 234 is adapted for communicating pressurized fluid from each fluid chamber 218 into one or more fluid outlets 235 fluidly connected at one or both ends of the fluid outlet cavity 234. The fluid outlets 235 may be in fluid communication with a corresponding conduit 144. The fluid section 210 also contains a plurality of outlet valves 236 each operable to control fluid flow from a corresponding fluid chamber 218 into the fluid outlet cavity 234. Each outlet valve 236 may be biased toward a closed flow position by a spring or another biasing member 238, which may be held in place by an outlet valve stop 240. Each outlet valve 236 may be actuated to an open flow position by a selected or predetermined differential pressure between the corresponding fluid chamber 218 and the fluid outlet cavity 234. The fluid outlet cavity 234 may be plugged by cover plates 242, such as may be threadedly engaged with the pump housing 216.

During pumping operations, portions of the power section 208 of the pump unit 200 rotate in a manner that generates a reciprocating linear motion to move the reciprocating members 222 longitudinally within the corresponding fluid chambers 218, thereby alternating drawing and displacing the fluid within the fluid chambers 218. With regard to each reciprocating member 222, as the reciprocating member 222 moves out of the fluid chamber 218, as indicated by arrow 221, the pressure of the fluid inside the corresponding fluid chamber 218 decreases, thus creating a differential pressure across the corresponding fluid inlet valve 228. The pressure differential operates to compress the biasing member 230, thus actuating the fluid inlet valve 228 to an open flow position to permit the fluid from the fluid inlets 226 to enter the corresponding fluid inlet cavity 224. The fluid then enters the fluid chamber 218 as the reciprocating member 222 continues to move longitudinally out of the fluid chamber 218 until the pressure difference between the fluid inside the fluid chamber 218 and the fluid at the fluid inlets 226 is low enough to permit the biasing member 230 to actuate the fluid inlet valve 228 to the closed flow position. As the reciprocating member 222 begins to move longitudinally back into the fluid chamber 218, as indicated by arrow 223, the pressure of the fluid inside of fluid chamber 218 begins to increase. The fluid pressure inside the fluid chamber 218 continues to increase as the reciprocating member 222 continues to move into the fluid chamber 218 until the pressure of the fluid inside the fluid chamber 218 is high enough to overcome the pressure of the fluid inside the fluid outlet cavity 234 and compress the biasing member 238, thus actuating the fluid outlet valve 236 to the open flow position and permitting the pressurized fluid to move into the fluid outlet cavity 234, the fluid outlets 235, and the corresponding fluid conduit 144.

The pump unit 200 may comprise one of more flow rate sensors 203 fluidly coupled with or along the fluid outlets 235 in a manner permitting monitoring of a fluid flow rate of the fluid flowing through the fluid outlets 235. Each flow sensor 203 may be or comprise a flow meter operable to measure the volumetric and/or mass flow rate of the fluid discharged from the pump unit 200 and may be operable to generate signals or information indicative of the flow rate of the fluid discharged from the pump unit 200. The pump unit 200 may further comprise a pressure sensor 205 disposed in association with the fluid section 210 in a manner permitting the sensing of fluid pressure at the fluid outlets 235. For example, the pressure sensor 205 may extend through one or more of the cover plates 242 or other portions of the corresponding pump housing 216 to monitor pressure within the fluid outlet cavity 234 and, thus, the fluid outlets 235 and the corresponding outlet conduits 144.

The fluid flow rate generated by the pump unit 200 may depend on the physical size of the reciprocating members 222 and fluid chambers 218, as well as the pump unit operating speed, which may be defined by the speed or rate at which the reciprocating members 222 cycle or move within the fluid chambers 218. The pumping speed, such as the speed or the rate at which the reciprocating members 222 move, may be related to the rotational speed of the power section 208 and/or the prime mover 204. Accordingly, the fluid flow rate generated by the pump unit 200 may be controlled by controlling the rotational speed of the power section 208 and/or the prime mover 204.

The prime mover 204 may comprise an engine, such as a gasoline engine or a diesel engine, an electric motor, such as a synchronous or asynchronous electric motor, including a synchronous permanent magnet motor, a hydraulic motor, or another prime mover operable to drive or otherwise rotate a drive shaft 252 of the power section 208. The drive shaft 252 may be enclosed and maintained in position by a power section housing 254. To prevent relative rotation between the power section housing 254 and the prime mover 204, the power section housing 254 and prime mover 204 may be fixedly coupled together or to a common base, such as a trailer of the mobile carrier 148.

The prime mover 204 may comprise a rotatable output shaft 256 operatively connected with the drive shaft 252 via a gear train or transmission 262, which may comprise a spur gear 258 coupled with the drive shaft 252 and a corresponding pinion gear 260 coupled with a support shaft 261. The output shaft 256 and the support shaft 261 may be coupled, such as may facilitate transfer of torque from the prime mover 204 to the support shaft 261, the pinion gear 260, the spur gear 258, and the drive shaft 252. For clarity, FIGS. 2 and 3 show the transmission 262 comprising a single spur gear 258 engaging a single pinion gear 260, however, it is to be understood that the transmission 262 may comprise a plurality of corresponding sets of gears, such as may permit the transmission 262 to be shifted between different gear configurations or speeds to control the operating speed of the drive shaft 252 and torque transferred to the drive shaft 252. Accordingly, the transmission 262 may be shifted between different gear sets ("gears") to vary the pumping speed and torque of the power section 208 to vary the fluid flow rate and maximum fluid pressure generated by the fluid section 210 of the pump unit 200. The transmission 262 may also comprise a torque converter (not shown) operable to selectively connect ("lock-up") the prime mover 204 with the transmission 262 and permit slippage ("unlock") between the prime mover 204 and the transmission 262. The torque converter and the gears of the transmission 262 may be shifted manually by the wellsite operator 164 or remotely via a gear shifter, which may be incorporated as part of a pump unit controller 213. The gear shifter may receive control signals from the control center 160 and output a corresponding electrical or mechanical control signal to shift the gear of the transmission 262 and lock-up the transmission, such as to control the fluid flow rate and the operating pressure of the pump unit 200.

The drive shaft 252 may be implemented as a crankshaft comprising a plurality of axial journals 264 and offset journals 266. The axial journals 264 may extend along a central axis of rotation of the drive shaft 252, while the offset journals 266 may be offset from the central axis of rotation by a selected or predetermined distance and spaced 120 degrees apart with respect to the axial journals 264. The drive shaft 252 may be supported in position within the power section 208 by the power section housing 254, wherein two of the axial journals 264 may extend through opposing openings in the power section housing 254, The power section 208 and the fluid section 210 may be coupled or otherwise connected together. For example, the pump housing 216 may be fastened with the power section housing 254 by a plurality of threaded fasteners 282. The pump 202 may further comprise an access door 298, which may facilitate access to portions of the pump 202 located between the power section 208 and the fluid section 210, such as during assembly and/or maintenance of the pump 202.

To transform and transmit the rotational motion of the drive shaft 252 to a reciprocating linear motion of the reciprocating members 222, a plurality of crosshead mechanisms 285 may be utilized. For example, each crosshead mechanism 285 may comprise a connecting rod 286 pivotally coupled with a corresponding offset journal 266 at one end and with a pin 288 of a crosshead 290 at an opposing end. During pumping operations, walls and/or interior portions of the power section housing 254 may guide each crosshead 290, such as may reduce or eliminate lateral motion of each crosshead 290. Each crosshead mechanism 285 may further comprise a piston rod 292 coupling the crosshead 290 with the reciprocating member 222. The piston rod 292 may be coupled with the crosshead 290 via a threaded connection 294 and with the reciprocating member 222 via a flexible connection 296.

The pump unit 200 may further comprise one or more rotational position and speed ("rotary") sensors 211 operable to generate a signal or information indicative of rotational position, rotational speed, and/or operating frequency of the pump 202. For example, one or more of the rotary sensors 211 may be operable to convert angular position or motion of the drive shaft 252 or another rotating portion of the power section 208 to an electrical signal indicative of pumping speed of the pump unit 200. The rotary sensor 211 may be mounted in association with an external portion of the drive shaft 252 or other rotating members of the power section 208. The rotary sensor 211 may also or instead be mounted in association of the prime mover 204 to monitor the rotational position and/or rotational speed of the prime mover 204, which may be utilized to determine the pumping speed of the pump unit 200. The rotary sensor 211 may be or comprise an encoder, a rotary potentiometer, a synchro, a resolver, and/or an RVDT, among other examples.

The pump unit controller 213 may further include prime mover power and/or control components, such as a variable frequency drive (VFD) and/or an engine throttle control, which may be utilized to facilitate control of the prime mover 204. The VFD and/or throttle control may be connected with or otherwise in communication with the prime mover 204 via mechanical and/or electrical communication means (not shown). The pump unit controller 213 may include the VFD in implementations in which the prime mover 204 is or comprises an electric motor and the pump unit controller 213 may include the engine throttle control in implementations in which the prime mover 204 is or comprises an engine. For example, the VFD may receive control signals from the control center 160 and output corresponding electrical power to control the speed and the torque output of the prime mover 204 and, thus, control the pumping speed and fluid flow rate of the pump unit 200, as well as the maximum pressure generated by the pump unit 200. The throttle control may receive control signals from the control center 160 and output a corresponding electrical or mechanical throttle control signal to control the speed of the prime mover 204 to control the pumping speed and, thus, the fluid flow rate generated by the pump unit 200. Although the pump unit controller 213 is shown located near or in association with the prime mover 204, the pump unit controller 213 may be located or disposed at a distance from the prime mover 204. For example, the pump unit controller 213 may be or form a portion of the control center 160.

A temperature sensor 207, such as a resistance temperature detector (RTD), may be disposed in association with the prime mover 204, such as to generate a signal or information indicative of a temperature of the prime mover 204. For example, the temperature sensor 207 may monitor the temperature within a motor winding, an engine housing, or within another portion of the prime mover 204. The temperature sensor 207 may be in communication with the control center 160, which may shut down the prime mover 204 if the detected temperature level exceeds a predetermined temperature level.

A moisture sensor 209 may also be disposed in association with the prime mover 204, such as to generate a signal or information indicative of moisture present at or near the prime mover 204. The moisture sensor 209 may be in communication with the control center 160, which may shut down the prime mover 204 if the moisture is detected by the moisture sensor 209.

As described above, the control center 160 may be further operable to monitor and control various operational parameters of the pump units 150, including the pump units 200. To facilitate monitoring of the pump units 200, the control center 160 may be in communication with the various sensors of the pump unit 200 including the flow rate sensors 203, the pressure sensors 205, the temperature sensor 207, the moisture sensor 209, and the rotary sensor 211. To facilitate control of the pump unit 200, the control center 160 may be in communication with the transmission 262 via the gear shifter of the controller 213, such as to control the flow rate and pressure generated by the pump unit 200. The control center 160 may also be in communication with the prime mover 204 via the VFD of the controller 213 if the prime mover 204 is an electric motor or via the throttle control of the controller 213 if the prime mover 204 is an engine, such as may permit the control center 160 to activate, deactivate, and control the flow rate generated by the pump unit 200.

Although FIGS. 2 and 3 show the pump unit 200 comprising a triplex reciprocating pump 202, which has three fluid chambers 218 and three reciprocating members 222, implementations within the scope of the present disclosure may include the pump 202 as or comprising a quintuplex reciprocating pump having five fluid chambers 218 and five reciprocating members 222, or a pump having other quantities of fluid chambers 218 and reciprocating members 222. It is further noted that the pump 202 described above and shown in FIGS. 2 and 3 is merely an example, and that other pumps, such as diaphragm pumps, gear pumps, external circumferential pumps, internal circumferential pumps, lobe pumps, and other positive displacement pumps, are also within the scope of the present disclosure.

Figure 4:
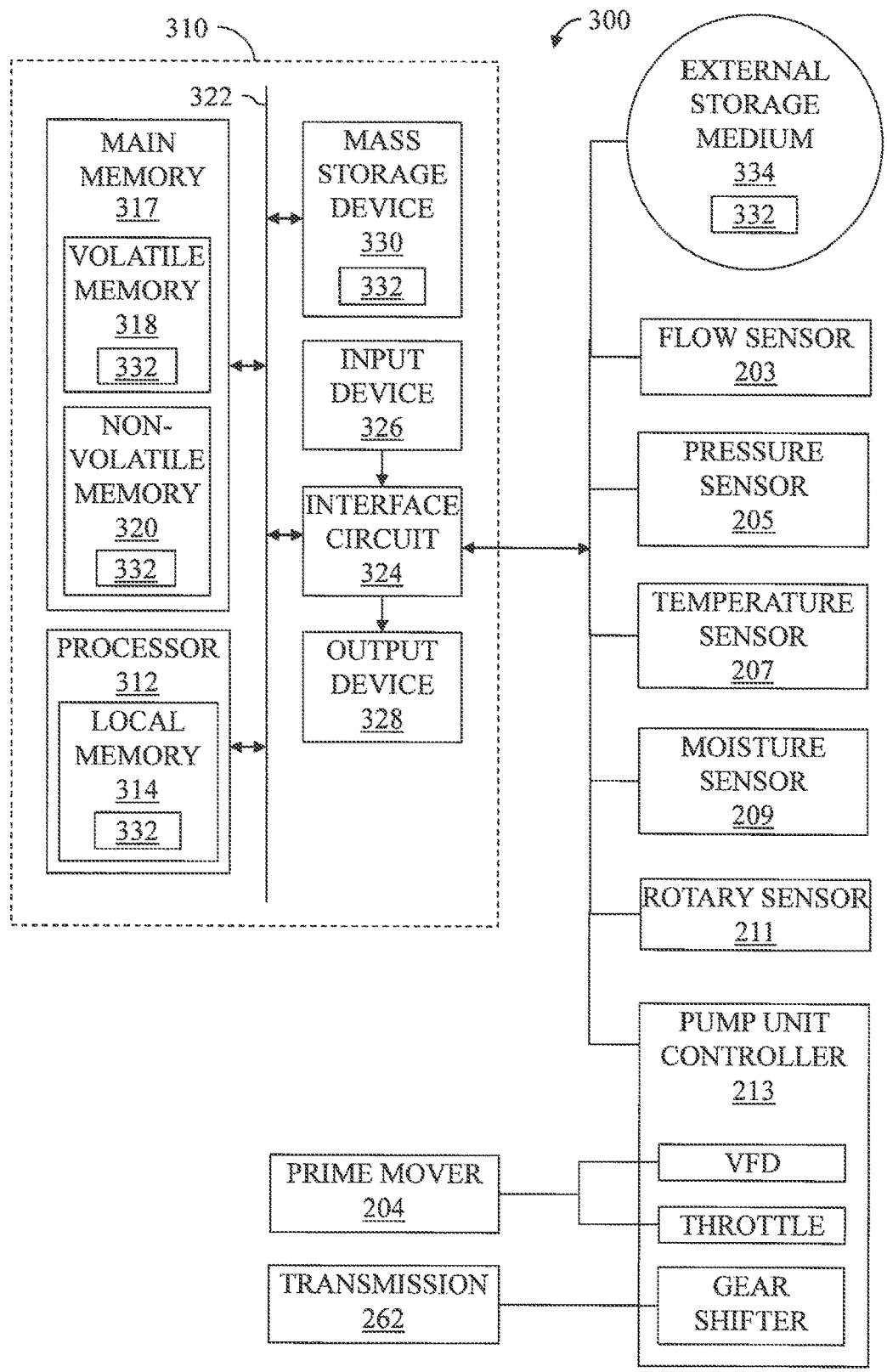
FIG. 4 is a schematic view of an example implementation of apparatus according to one or more aspects of the present disclosure.

The present disclosure further provides various embodiments of systems and/or methods for an adaptive, learning-based approach for controlling various portions of the wellsite system 100, including the pump units 200 described above. An implementation of such system may comprise a control system 300, such as may be operable to monitor and/or control operations of the pump units 200, including fluid flow rate generated by the pump units 200. FIG. 4 is a schematic view of a portion of an example implementation of the control system 300 according to one or more aspects of the present disclosure. The following description refers to FIGS. 1-4, collectively.

The control system 300 may include a controller 310 in communication with the flow sensor 203, the pressure sensor 205, the temperature sensor 207, the moisture sensor 209, the rotary sensor 211, and the prime mover 204 and transmission 262 via the pump unit controller 213. For clarity, these and other components in communication with the controller 310 will be collectively referred to hereinafter as "sensors and controlled components." The controller 310 may be operable to receive signals or information from the various sensors of the control system 300 indicative of the various operational parameters of the pump unit 200. The controller 310 may be further operable to process such operational parameters and communicate control signals to the prime mover 204 and the transmission 262 to execute example machine-readable instructions to implement at least a portion of one or more of the example methods and/or processes described herein, and/or to implement at least a portion of one or more of the example systems described herein. The controller 310 may be or form a portion of the control center 160 described above.

The controller 310 may be or comprise, for example, one or more processors, special-purpose computing devices, servers, personal computers, personal digital assistant (PDA) devices, smartphones, internet appliances, and/or other types of computing devices. The controller 310 may comprise a processor 312, such as a general-purpose programmable processor. The processor 312 may comprise a local memory 314, and may execute coded instructions 332 present in the local memory 314 and/or another memory device. The processor 312 may execute, among other things, machine-readable instructions or programs to implement the example methods and/or processes described herein. The programs stored in the local memory 314 may include program instructions or computer program code that, when executed by an associated processor, facilitate the pump unit 200 to perform the example methods and/or processes described herein. The processor 312 may be, comprise, or be implemented by one or a plurality of processors of various types suitable to the local application environment, and may include one or more of general-purpose computers, special-purpose computers, microprocessors, digital signal processors (DSPs), field-programmable gate arrays (FPGAs), application-specific integrated circuits (ASICs), and processors based on a multi-core processor architecture, as non-limiting examples. Of course, other processors from other families are also appropriate.

The processor 312 may be in communication with a main memory 317, such as may include a volatile memory 318 and a non-volatile memory 320, perhaps via a bus 322 and/or other communication means. The volatile memory 318 may be, comprise, or be implemented by random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 320 may be, comprise, or be implemented by read-only memory, flash memory, and/or other types of memory devices. One or more memory controllers (not shown) may control access to the volatile memory 318 and/or non-volatile memory 320. The controller 310 may be operable to store or record information entered by the wellsite operator 164 and/or information generated by the sensors and controlled components on the main memory 317.

The controller 310 may also comprise an interface circuit 324. The interface circuit 324 may be, comprise, or be implemented by various types of standard interfaces, such as an Ethernet interface, a universal serial bus (USB), a third generation input/output (3GIO) interface, a wireless interface, and/or a cellular interface, among others. The interface circuit 324 may also comprise a graphics driver card. The interface circuit 324 may also comprise a communication device, such as a modem or network interface card to facilitate exchange of data with external computing devices via a network (e.g., Ethernet connection, digital subscriber line (DSL), telephone line, coaxial cable, cellular telephone system, satellite, etc.). One or more of the sensors and controlled components may be connected with the controller 310 via the interface circuit 324, such as may facilitate communication between the sensors and controlled components and the controller 310.

One or more input devices 326 may also be connected to the interface circuit 324. The input devices 326 may permit the wellsite operator 164 to enter the coded instructions 332, operational target set-points, and/or other data into the processor 312. The operational target set-points may include, but not limited to, a pressure target set-point, a flow rate target set-point, a pump operating or pumping speed target set-point, and a time or duration target set-point, among other examples. The coded instructions may also include an initial flow rate achievability curve and belief algorithm, such as may be utilized by the controller 310 to update the initial flow rate achievability curve to predict or determine probability of achieving various flow rates by the pump unit. The coded instructions 332 and operational target set-points are described in more detail below. The input devices 326 may be, comprise, or be implemented by a keyboard, a mouse, a touchscreen, a track-pad, a trackball, an isopoint, and/or a voice recognition system, among other examples. One or more output devices 328 may also be connected to the interface circuit 324. The output devices 328 may be, comprise, or be implemented by display devices (e.g., a liquid crystal display (LCD) or cathode ray tube display (CRT)), printers, and/or speakers, among other examples. The controller 310 may also communicate with one or more mass storage devices 330 and/or a removable storage medium 334, such as may be or include floppy disk drives, hard drive disks, compact disk (CD) drives, digital versatile disk (DVD) drives, and/or USB and/or other flash drives, among other examples.

The coded instructions 332, the operational target set-points, and/or other data may be stored in the mass storage device 330, the main memory 317, the local memory 314, and/or the removable storage medium 334. Thus, the controller 310 may be implemented in accordance with hardware (perhaps implemented in one or more chips including an integrated circuit, such as an application specific integrated circuit), or may be implemented as software or firmware for execution by the processor 312. In the case of firmware or software, the implementation may be provided as a computer program product including a computer readable medium or storage structure embodying computer program code (i.e., software or firmware) thereon for execution by the processor 312.

The coded instructions 332 may include program instructions or computer program code that, when executed by the processor 312, may cause the pump unit 200 to perform methods, processes, and/or routines described herein. For example, the controller 310 may receive and process the operational target set-points entered by the operator 164 and the signals or information generated by the various sensors described herein indicative of the operational parameters of the pump unit 200. Based on the coded instructions 332 and the received operational target set-points and operational parameters, the controller 310 may send signals or information to the prime mover 204 and the transmission 262 to cause the pump unit 200 and/or other portions of the wellsite system 100 to automatically perform and/or undergo one or more operations or routines within the scope of the present disclosure. For example, the controller 310 may cause the pump units 200 to perform pumping operations at intended flow rates substantially without manual control by the wellsite operator 164. The controller 310 may also assess operational health of the pump units 200.

The present disclosure is further directed to an adaptive, learning-based approach for automated control of flow rates discharged by one or more of the pump units 200 by utilizing a mathematical belief model for controlling gear settings of the transmissions 262 and operating speeds of the pump units 200 (i.e., speeds of the prime movers 204 and/or the pumps 202) to achieve a target (i.e., intended) flow rate of the pump units 200. The belief model may be generated utilizing a stochastic algorithm utilizing variables that evolve over time depending on changes in operation of the pump units 200. The belief model may be generated using, for example, Markov and Monte Carlo localization algorithms, such as may generate a probability distribution curve to describe the dynamics of the flow rate and pressure relationship of the pump units 200. The initial conditions for the belief model may be based on optimum performance specifications of the pump units 200, such as horse power curves, torque curves, and maximum flow rate/operating pressure curves provided by the manufacturer of the pump units 200.

The belief model within the scope of the present disclosure may be generated by the controller 310 based on a mathematical algorithm, such as may be entered into the controller 310 as part of the coded instructions 332, which may be executed by the controller 310 to control the pump units 200 to perform methods or operations described herein. Accordingly, the controller 310 may utilize the belief model to automatically control the fluid flow rates generated by the pump units 200 by inputting into the controller 310 the target flow rates, without inputting or otherwise setting the transmission gear and/or operating speed (i.e., throttle) of the pump units 200 to achieve the target flow rates.

The controller 310 may utilize the belief model to determine or predict an optimal way to achieve the target flow rate for each pump unit 200, such as by determining optimal transmission gear setting and pump unit operating speed setting to achieve the intended flow rate. The transmission gear and pump unit speed settings may be referred to hereinafter as "operation set-points." The controller 310 may then operate each pump unit 200 utilizing the operation set-points acquired from the belief model. Based on the result of the operation, the belief model may be updated and "achievability" (i.e., probability of achieving a certain flow rate at a corresponding pressure) may be increased or decreased based on success of pumping operations. Given that the belief model is updated, the future answers for "is a certain target flow rate achievable?" and "what is the optimal way to achieve the target flow rate?" will be affected by the results of the previous operations. The belief model may be continuously updated based on the operations performed by the pump units 200, such as the resulting flow rates generated by the pump units 200. Therefore, the belief model may continuously "learn" the capabilities and limitations of the pump units 200, such that the controller 310 may make improved predictions/decisions when utilizing the belief model.

Figure 5:
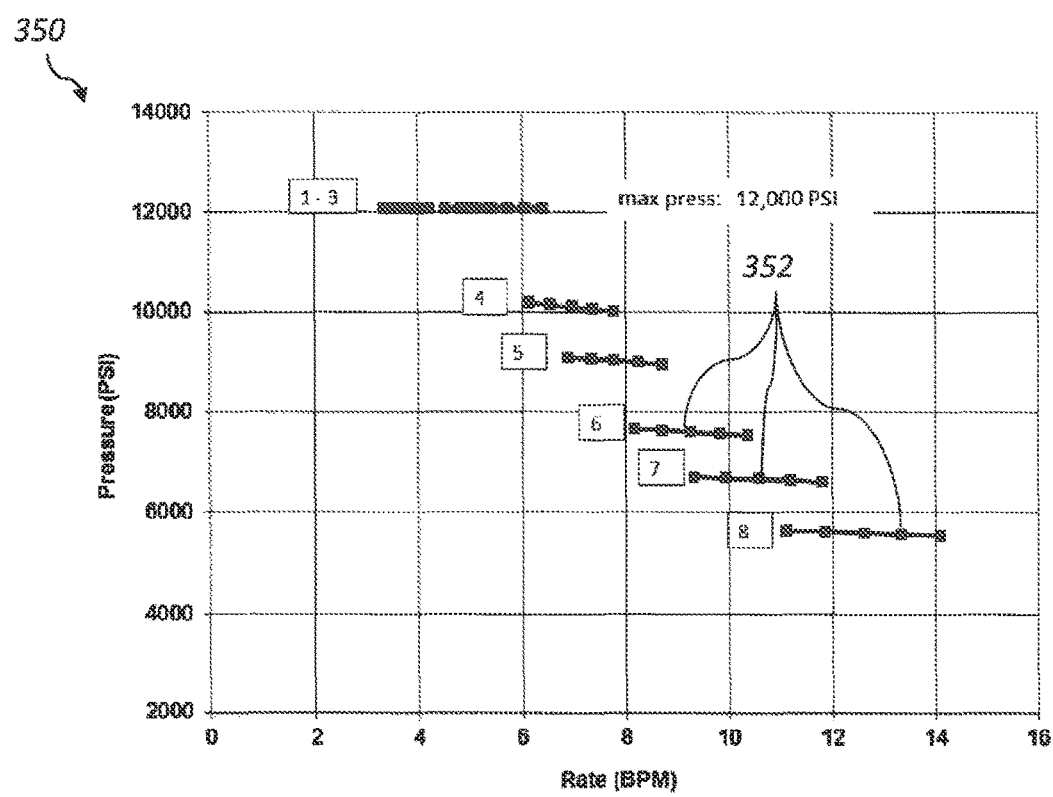
FIGS. 5-12 are graphs related to one or more aspects of the present disclosure.

FIG. 5 is a graph 350 related to one or more aspects of the present disclosure. The graph 350 shows example maximum flow rate performance curves 352 for a pump unit, such as the pump unit 200. The curves 352 indicate a relationship between flow rate, shown in barrels per minute (BPM) along the horizontal axis, and operating or discharge pressure, shown in pounds per square inch (PSI) along the vertical axis. The performance curves 352 show expected performance of the pump unit under optimal operating conditions. Each curve 352 is associated with a different transmission gear and indicates the maximum flow that the pump unit may achieve as the operating speed of the pump unit increases at each gear.

Figure 6:
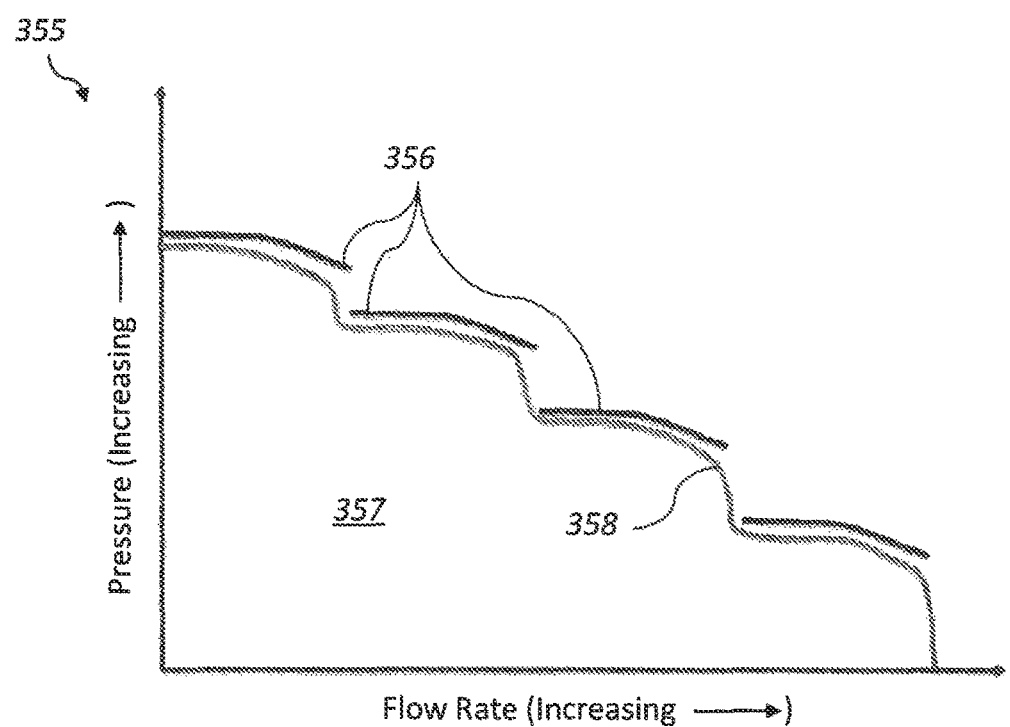

FIG. 6 is a graph 355 related to one or more aspects of the present disclosure. The graph 355 shows example maximum flow rate performance curves 356 for a pump unit, such as the pump unit 200. Similarly to the curves 352 shown in FIG. 5, the curves 356 indicate a relationship between flow rate, shown in along the horizontal axis, and operating pressure, shown along the vertical axis, under optimal operating conditions. Each curve 356 is associated with a different transmission gear and indicates the maximum flow that the pump unit may achieve as the operating speed of the pump unit increases at each gear. The graph 355 further shows an initial belief model 357 generated based on the optimal performance curves 356. As shown, the initial belief model 357 comprises a flow rate performance curve 358 that closely coincides with, but does not exceed, the performance curves 356 as the initial belief model 357 is configured to associate such flow and pressure combinations with 0% achievability.

Figure 7:
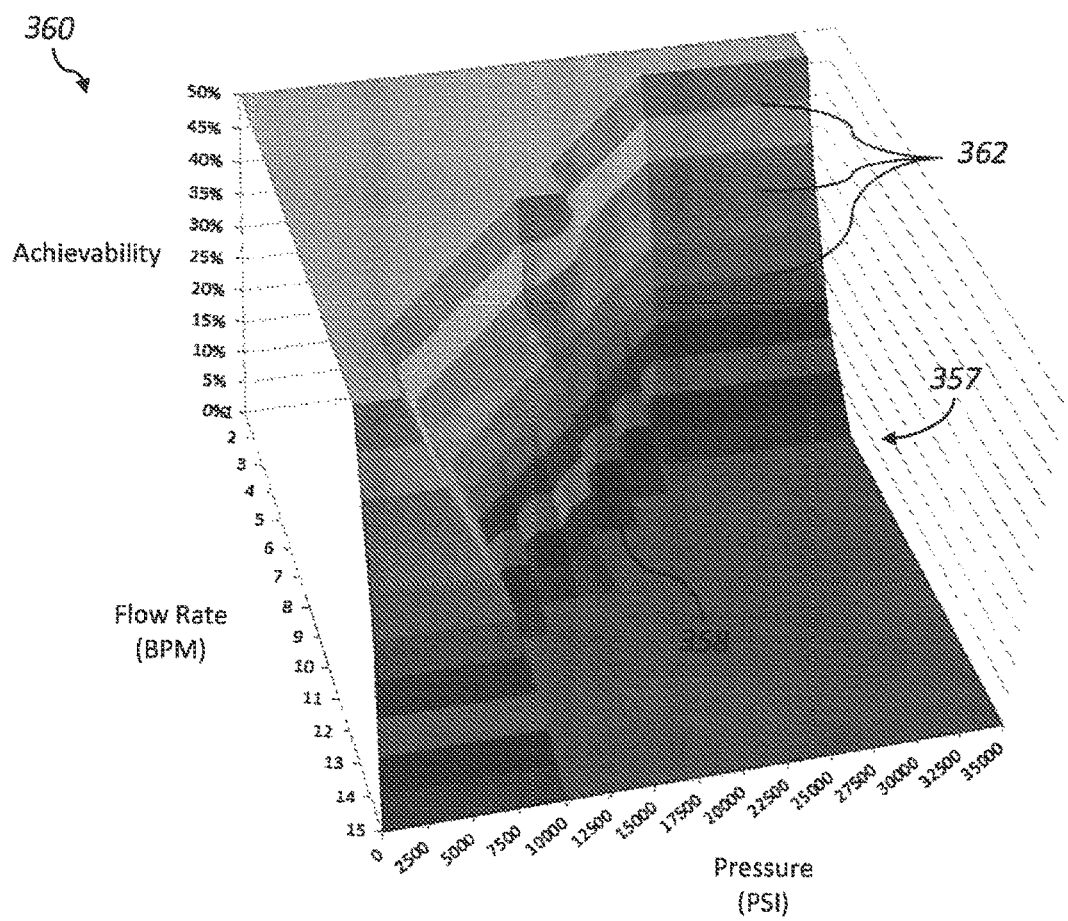

In addition to the flow rate performance curve along the flow rate and pressure axes, a belief model within the scope of the present disclosure may extend along a third axis that indicates the achievability of a certain point along the performance curve and other points along the belief model. FIG. 7 is a graph 360 related to one or more aspects of the present disclosure. The graph 360 shows the initial belief model 357 shown in the graph 355 in FIG. 5 with the flow rate shown along a first horizontal axis and the operating pressure shown along a second horizontal axis. The graph 360 further shows the initial belief model 357 with an achievability axis extending vertically resulting in the belief model 357 comprising a three dimensional performance curve that continuously changes with achievability. The initial belief model 357 may comprise or be divided into a plurality of performance curves 362 (or performance bands located between the curves 362), each associated with an achievability value indicated along the achievability axis. The performance curve 358, which closely coincides with the performance curves 356, is shown associated with the achievability of 0%. The graph 360 indicates that as the target flow rate and operating pressure of the pump units increase, the achievability of such performance (i.e., probability of achieving such performance) decreases.

Figure 8:
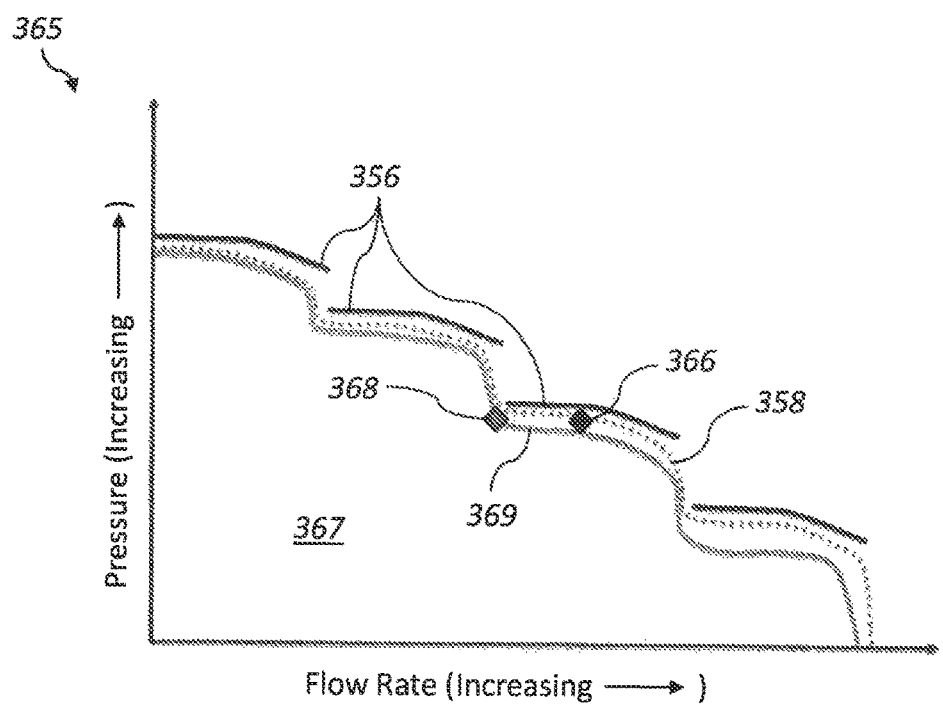
Figure 9:
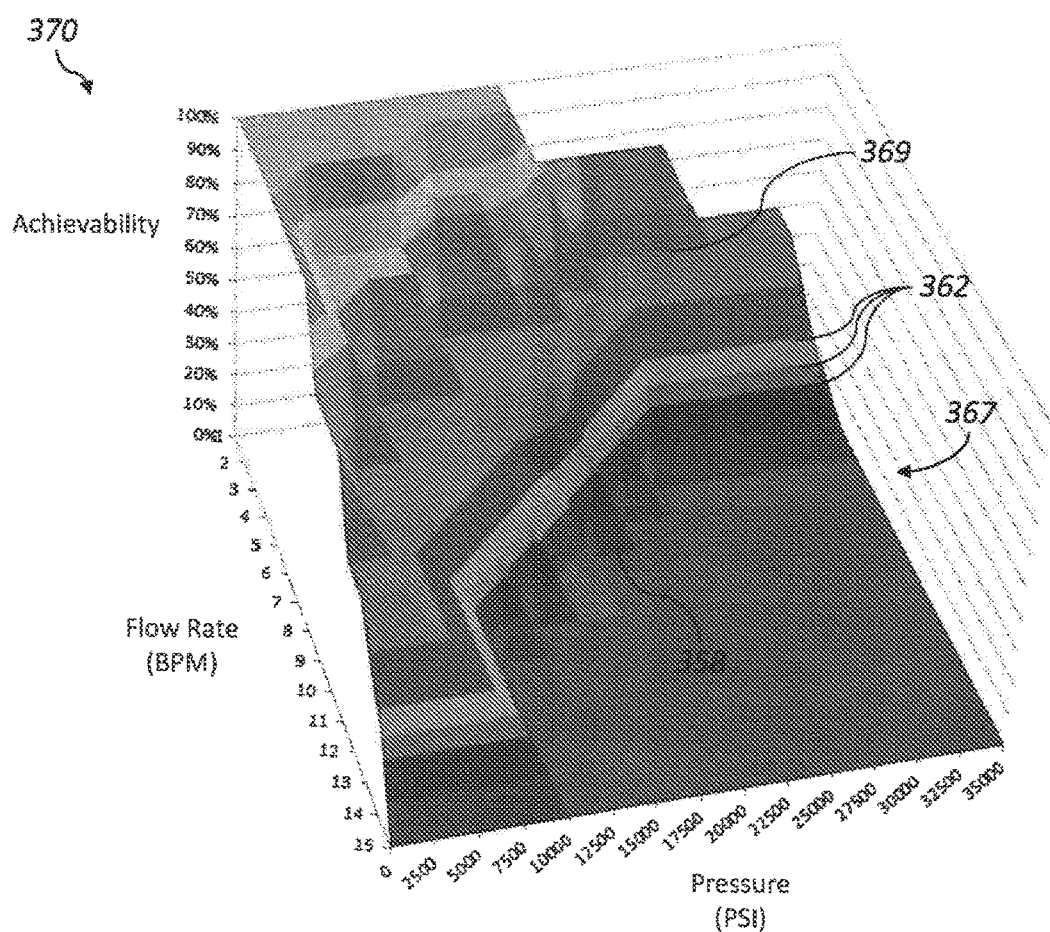

The initial belief model 357 may be updated via the operation of the controller 310 executing algorithms or other coded instructions 332 within the scope of the present disclosure as the belief model 357 "experiences" the achievability of certain flow rates at corresponding operating pressures. FIGS. 8 and 9 are graphs 365, 370, respectively, related to one or more aspects of the present disclosure showing adjusted belief models 367 based on a failure to achieve a target flow rate. The graph 365 shows an attempted target flow rate at corresponding pressure at point 366 located along the initial performance curve 358. The failed attempt resulted in an actual flow rate and pressure at point 368. Such failed attempt may result in the belief model being updated by decreasing the achievability associated with the performance curve 358 by a predetermined amount and increasing the achievability associated with a performance curve 369 extending through or coinciding with the point 368 by a predetermined amount. For example, the performance curve 369 may be increased to 50% achievability and the since the performance curve 358 was initially associated with 0% achievability, it may be maintained at 0% achievability. The belief model 367 may also interpolate achievability for other performance curves 362 for flow rates and pressures between the performance curves 358, 369 and/or extrapolate performance curves 362 for flow rates and pressures below the performance curve 369.

Figure 10:
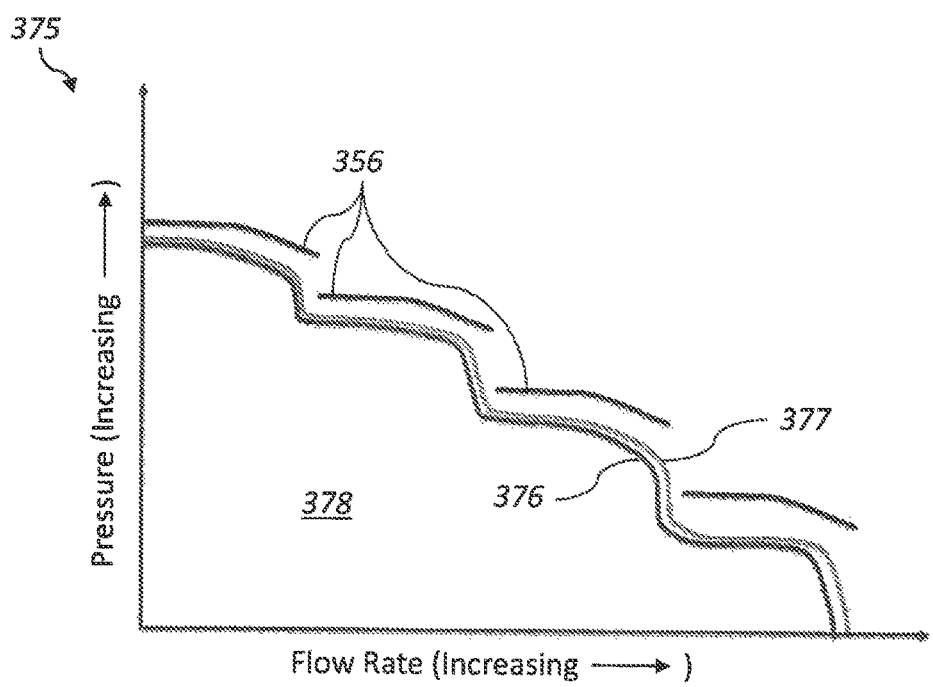

FIG. 10 is a graph 375 related to one or more aspects of the present disclosure showing an optimal performance curve 376 within a current performance curve 377 of a belief model 378. For example, a pump unit may be caused to operate at optimal parameters (e.g., efficiency) along the optimal performance curve 376. Depending on the optimization parameters (e.g., 95% maximum throttle, horse power, etc.), the optimal performance curve 376 may be moved closer or away from the current performance curve 377 to control how efficiently to utilize the pump units based on a balance between pump unit reliability (i.e., achievability) and efficiency of performance.

Figure 11:
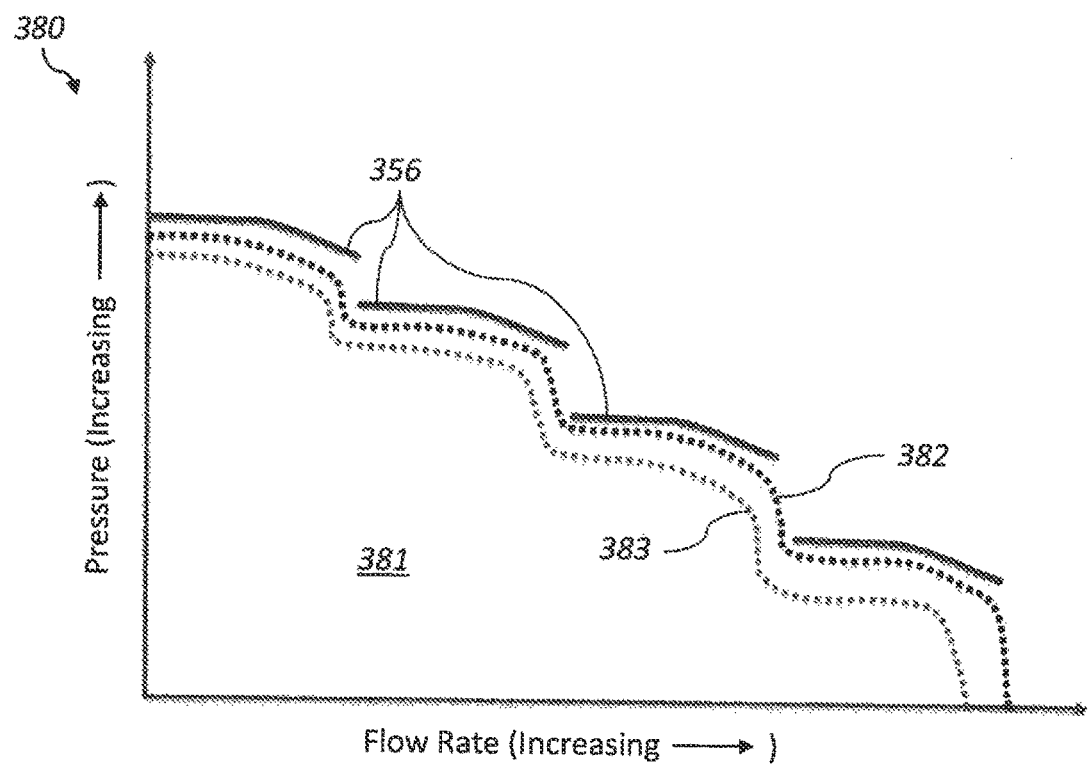

Belief models within the scope of the present disclosure may provide a range of achievability. Depending on programming and the parameter the controller 310 is trying to optimize, the controller 310 may choose to take lower or higher risks of failure. FIG. 11 is a graph 380 related to one or more aspects of the present disclosure showing a belief model 381 and performance curves 382, 383 having different achievability levels. For example, if a target flow rate is too close to the performance curve 382, the controller 310 may select a flow rate that is closer to the performance curve 383. The decision may be made by weighing the parameters provided by both performance curves 382, 383.

As described above, the belief model may be a stochastic mathematical model calculated or otherwise generated based on operational parameters of the prime mover 204 (e.g., engine or motor), the transmission 262, the power end 208, and the fluid end 210. The belief model may calculate the theoretical flow rates for a range of speed and gear combinations for a particular pump unit 200. In addition, based on calculated pump torque, the belief model may calculate maximum operating pressure for the range of gear and speed combinations.

Figure 12:
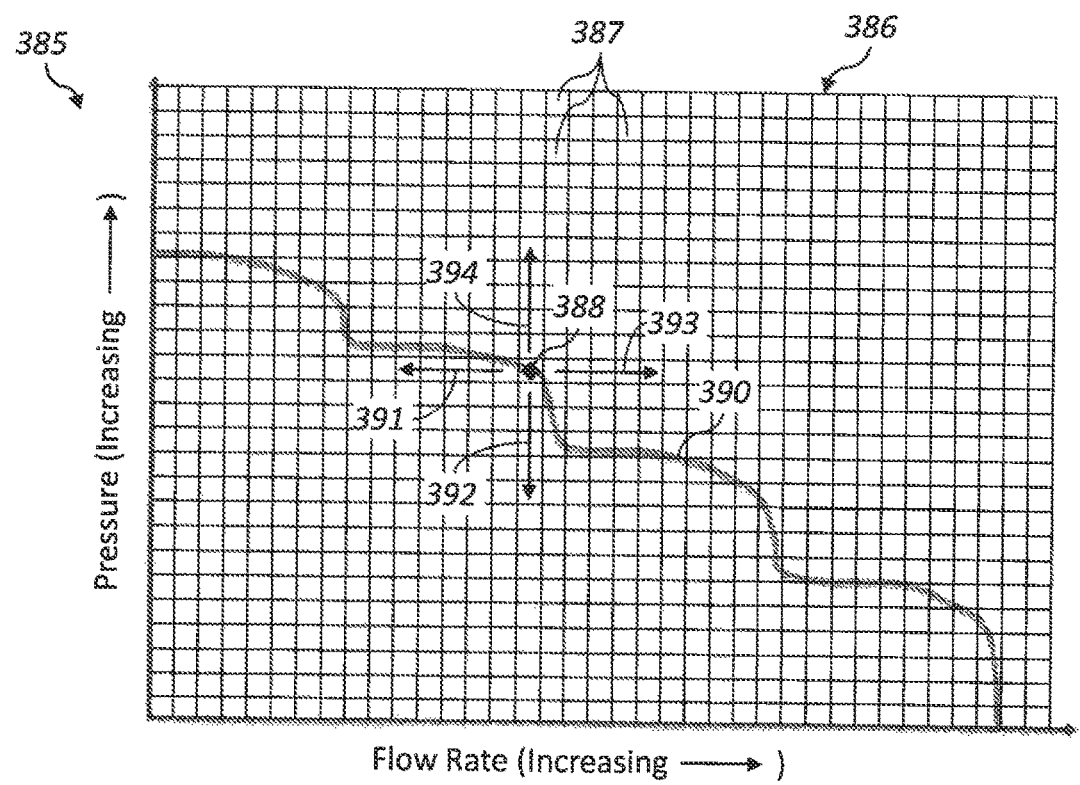

FIG. 12 is a graph 385 related to one or more aspects of the present disclosure showing a belief model in the form of an achievability matrix 386. Using the calculated flow rates and maximum operating pressures for each operation set-point, the belief model may create or be implemented as the achievability matrix in which each cell 387 along or below a performance curve 390 corresponds to a flow rate, shown along the horizontal axis, and a pressure range, shown along the vertical axis. Each cell 387 may further correspond to operation set-points that result in the associated flow rate and discharge pressure range. A default achievability may be associated to each cell 387 having operation set-points (i.e., cells located along or under the performance curve 390). Cells 387 in the achievability matrix without operation set-points (i.e., located above the performance curve 390) correspond to unachievable flow rates, or simply unachievable cells. Achievability may refer to the probability of achieving the target flow rate at a corresponding pressure while operating the pump unit 200 at the operation set-points. Thus, the achievability of a cell 387 may be the probability of achieving the target flow rate at a corresponding pressure associated with the cell 387, while operating the pump unit 200 at the operation set-points associated with the cell 387.

After the belief model (i.e., the achievability matrix 386) is created, it may be consulted or otherwise utilized by the controller 310 to predict whether a certain target flow rates are achievable at certain pressures. Thus, the target flow rate may be achieved by determining which operation set-point is optimal to achieve the target flow rate. Furthermore, the belief model may be optimized by traversing the cells 387 and keeping the operation set-points associated with cells 387 having achievability that is greater than or equal to a predetermined probability threshold. Also, the belief model may be utilized to predict the "next best" achievable flow rate if an initial target flow rate is unachievable.

When the operation set-point obtained by consulting the belief model is utilized to operate a pump unit 200, various aspects of the pumping operations may be monitored for success. For example, if a target flow rate, shown at point 388, is achieved and the transmission 262 "locks up" (i.e., pump unit state in which the torque converter of the transmission 262 is locked up), the pumping operations may be considered successful. The belief model may then be updated accordingly by increasing the achievability of the current cell (i.e., the cell encompassing the target flow rate and pressure at point 388). In addition to increasing the achievability of the current cell, cells associated with lower flow rates, as indicated by arrow 391, and lower pressures, as indicated by arrow 392, are also increased. The reasoning behind that is the logical assumption that if a certain flow rate was achieved at a certain pressure, it is easier for the pump unit to achieve such flow rate at lower pressures, as well as lower flow rates at the same pressure. Other portions of the belief model located along or below the performance curve 390 may also be updated by increasing the achievability of certain cells with flow rates greater than and pressures lower than at point 388, as well as increasing the achievability of certain cells associated with flow rates less than and pressures greater than at point 388. The reasoning behind that may be based on the pump unit performance specifications and/or laws of conservation of mechanical energy, whereby if a certain flow rate was achieved at a certain pressure, a higher flow rate may be achieved at a lower pressure and a lower flow rate may be achieved at a higher pressure.

However, the opposite is also true, such that if a pump unit fails to achieve the intended flow rate at a certain pressure, such as at point 388, the belief model may be updated by decreasing the achievability of the current cell. In addition to decreasing the achievability of the current cell, achievability of cells associated with higher flow rates, as indicated by arrow 393, and higher pressures, as indicated by arrow 394, are also decreased. The belief model may also be updated by decreasing the achievability of certain cells above the performance curve 390 associated with lower flow rates, but higher pressures, as well as the achievability of certain cells above the performance curve 390 associated with higher flow rates, but lower pressures.

Systems and methods within the scope of the present disclosure may be adaptive or otherwise updatable according to one or more aspects of the present disclosure. For example, when the belief model is utilized by the controller 310 to determine the operation set-points for an intended flow rate that is not achievable, the belief model may provide the controller 310 with another (i.e., next best) achievable cell associated with a lower flow rate and provide the operation set-points associated with the cell. Furthermore, when the pump unit fails to achieve the intended flow rate using the operation set-points associated with the current cell, the belief model may provide another cell, which may be associated with operation set-points that produce an achievable (i.e., lower) flow rate. After the flow rate is achieved, the controller 310 may continue to monitor the operating speed of the pump unit. If an external factor (e.g., wellbore pressure increase) affects the pump unit causing the flow rate to be different from the intended flow rate, the controller 310 may utilize the belief model to provide yet another cell associated with a lower achievable flow rate and operation set-points that may be utilized to operate the pump unit at such lower achievable flow rate, if the external factor is removed and the original target flow rate becomes achievable again, the controller 310 may operate the pump unit to achieve the original target flow rate. Accordingly, using continuous learning and monitoring, the belief model within the scope of the present disclosure may learn the capabilities and limitations of different pump units and continue to optimize or improve decisions as the belief model is consulted or otherwise utilized during operations of the pump units.

The present disclosure is further directed to computer algorithms, such as may be executed to perform methods according to one or more aspects of the present disclosure. The algorithms may be implemented as or form the coded instructions 332 and be executed by the controller 310 to control the pump units 200 to perform the methods. One or more algorithms within the scope of the present disclosure may utilize a belief model to perform or cause the methods described herein.

Figure 13:
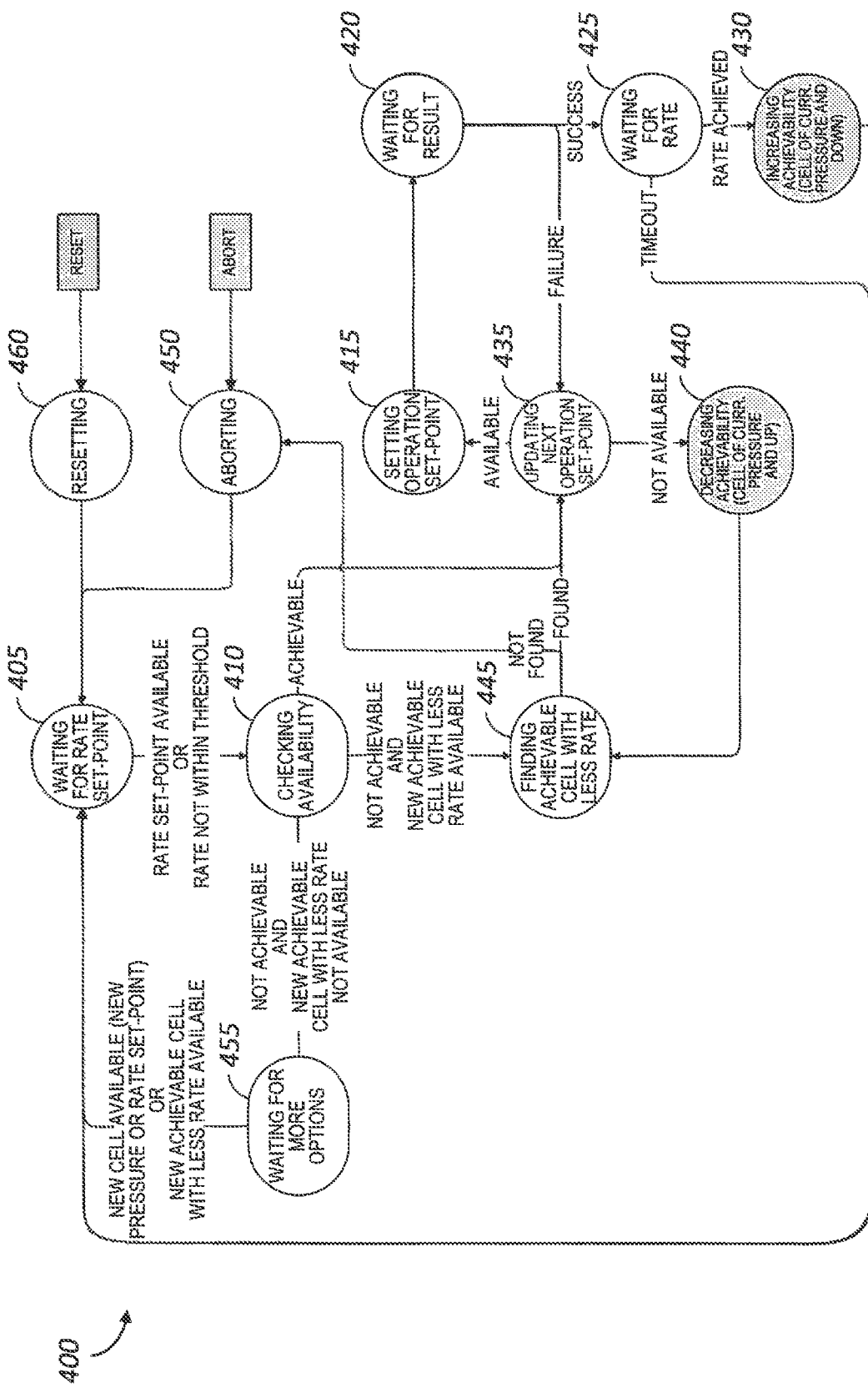
FIG. 13 is a flow-chart diagram of at least a portion of an example implementation of a method according to one or more aspects of the present disclosure.

FIG. 13 is a flow-chart diagram of at least a portion of an example implementation of an algorithm (400) according to one or more aspects of the present disclosure. The algorithm (400) may be performed utilizing or otherwise in conjunction with at least a portion of one or more implementations of one or more instances of the apparatus shown in one or more of FIGS. 1-4, the belief model shown in one or more of FIGS. 5-12, and/or otherwise within the scope of the present disclosure. For example, the algorithm (400) may be performed and/or caused, at least partially, by the controller 310 executing the coded instructions 332 according to one or more aspects of the present disclosure. Thus, the following description of the algorithm (400) also refers to apparatus shown in one or more of FIGS. 1-4 and the belief model shown in one or more of FIGS. 5-12. However, the algorithm (400) may also be performed in conjunction with implementations of apparatus and belief model other than those depicted in FIGS. 1-12 that are also within the scope of the present disclosure.

The algorithm (400) may comprise waiting (405) by the controller 310 to receive a target flow rate set-point from a wellsite operator 164. The controller 310 may then consult a belief model to check availability (410) to determine if such target flow rate is within an initial performance curve or otherwise within a predetermined performance curve.

If the target flow rate is achievable, the controller 310 may set (415) or otherwise utilize operation set-points associated with the target flow rate to cause the prime mover 204 and the transmission 262 to operate at such operation set-points. The controller 310 may then wait (420) while monitoring speed, fluid flow, pressure, and/or other operational parameters to determine whether the pump unit 200 successfully reached the target flow rate. An example implementation of the setting (415) and the waiting (420) operations are collectively described below in association with an algorithm (500) shown in FIG. 14. If the target flow rate was successfully achieved, the flow rate may be recorded (425) and the belief model may be updated by increasing (430) achievability of the belief model at the target flow rate and corresponding pressure, along the performance curve associated with the target flow rate and corresponding pressure, and/or the portion of the belief model associated with lower flow rates and pressures, as described above. The pump unit 200 may continue to operate until new target flow rate is entered (405). If the target flow rate was not achieved, the controller 310 may consult the belief model to determine (435) a new speed and gear operation set-point and set (415) the new operation set-points to cause the prime mover 204 and the transmission 262 to operate at the new operation set-points. If the target flow rate was successfully achieved, the flow rate may be recorded (425) and the belief model may be updated as described above. However, if new speed and gear operation set-points are not available to reach the target flow rate, the belief model may be updated by decreasing (440) achievability of the belief model at the target flow rate and corresponding pressure, along the performance curve associated with the target flow rate and corresponding pressure, and/or the portion of the belief model associated with higher flow rates and pressures, as described above.

If based on checking the availability (410) the controller 310 determines that the target flow rate is not available, but a lesser flow rate is available, the controller 310 may consult the belief model to find (445) such target flow rate, and then set (415) operation set-points associated with the target flow rate to cause the prime mover 204 and the transmission 262 to operate at such operation set-points. The controller 310 may then wait for results (420) and conduct appropriate operations based on success or failure in reaching the target flow rate, as described above. However, if the controller 310 cannot find (445) the target flow rate, then the controller 310 may abort (450) the execution of the algorithm (400).

If based on checking the availability (410) the controller 310 determines that the target flow rate is not available and another lesser flow rate is also not available, such as if the wellbore pressure is above maximum operating pressure of the pump unit 200, the controller 310 may wait (455) for other options. For example, the controller 310 may wait (455) for decrease in wellbore pressure. However, the wellsite operator 164 may also enter (405) another target flow rate, which may be available. The wellsite operator 164 may also reset (460) the execution of the algorithm (400), such as to cause the controller 310 to wait (405) to receive a target flow rate set-point.

Figure 14:
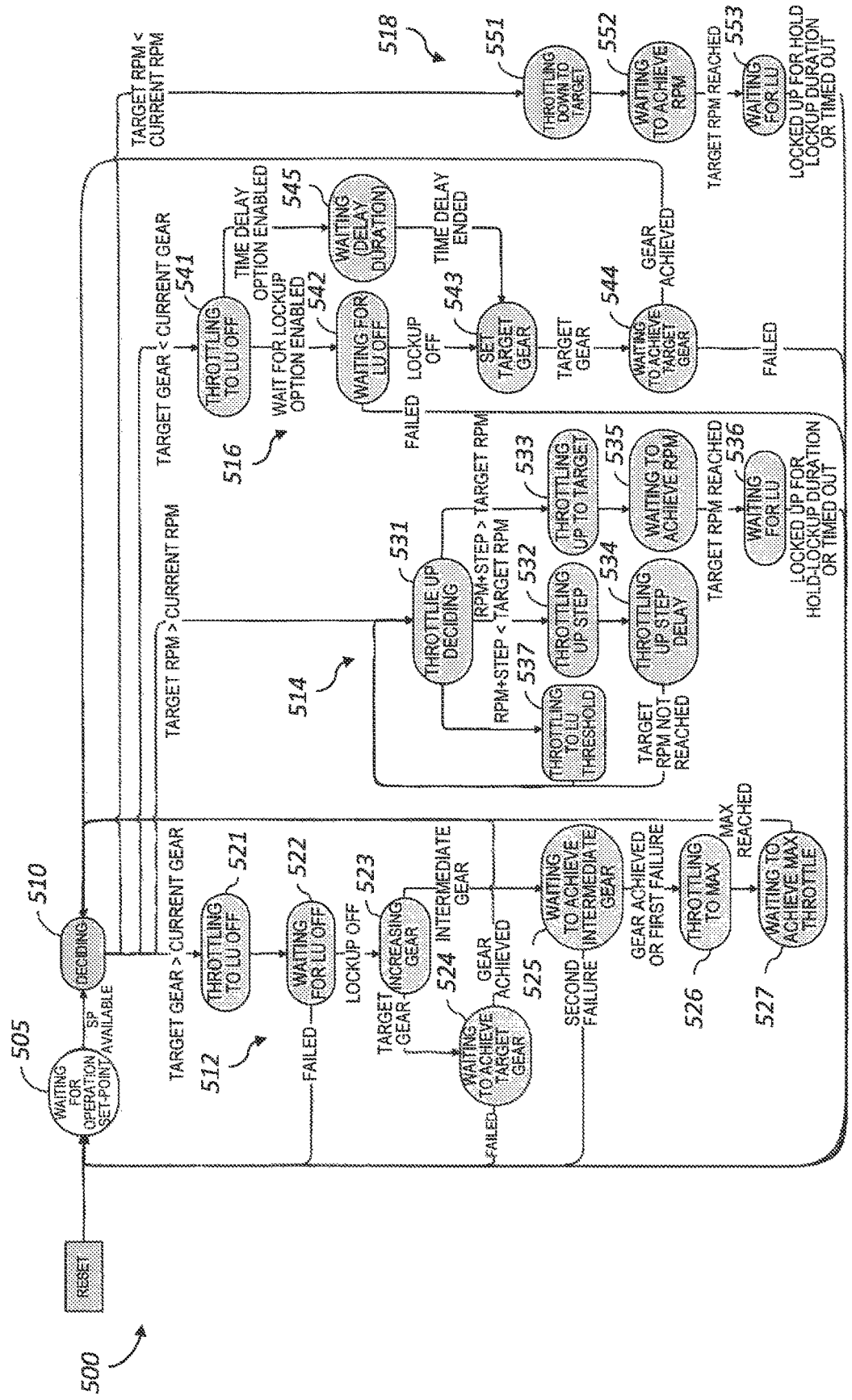
FIG. 14 is a flow-chart diagram of at least a portion of an example implementation of a method according to one or more aspects of the present disclosure.

FIG. 14 is a flow-chart diagram of at least a portion of an example implementation of an algorithm (500) according to one or more aspects of the present disclosure. The algorithm (500) may be performed utilizing or otherwise in conjunction with at least a portion of one or more implementations of one or more instances of the apparatus shown in one or more of FIGS. 1-4, the belief model shown in one or more of FIGS. 5-12, the algorithm (400) shown in FIG. 13, and/or otherwise within the scope of the present disclosure. For example, the algorithm (500) may be performed and/or caused, at least partially, by the controller 310 executing the coded instructions 332 according to one or more aspects of the present disclosure. Thus, the following description of the algorithm (500) also refers to apparatus shown in one or more of FIGS. 1-4, the belief model shown in one or more of FIGS. 5-12, and the algorithm (400) shown in FIG. 13. However, the algorithm (500) may also be performed in conjunction with implementations of apparatus, belief model, and algorithm other than those depicted in FIGS. 1-13 that are also within the scope of the present disclosure.

The algorithm (500) may comprise waiting (505) by the controller 310 for operation set-points generated as part of the algorithm (400) described above. If the operation set-points are determined to be available, the controller 310 may decide on (510) or otherwise select one of four routines (512, 514, 516, 518) for implementing the selected operation set-points.

The first routine (512) may be implemented if a target transmission gear is greater than a current transmission gear. The routine (512) may include throttling down (521) such that the transmission 262 can be unlocked to disconnect the prime mover 204 from the pump 202. The controller 310 may wait (522) for the transmission 262 to be unlocked. If the transmission 262 failed to unlock, such failure may be communicated to the controller 310, which may than wait (505) for another operation set-point. If the transmission 262 was successfully unlocked, the controller 310 may cause the transmission to increase (523) the gear by shifting (524) directly to the target gear or by shifting (525) to an intermediate gear. If the transmission 262 failed to shift gears, such failure may be communicated to the controller 310, which may than wait (505) for another operation set-point. If the target gear was achieved, the controller 310 may compare the speed (i.e., throttle) of the pump unit 200 to decide (510) if additional gear and/or speed adjustments should be implemented. Furthermore, if the intermediate gear was achieved, the speed of the pump unit 200 may be set (526) to maximum and the controller 310 may then wait (527) until such maximum speed is reached. Once the maximum speed is reached, the controller 310 may compare the speed of the pump unit 200 to decide (510) if additional gear and/or speed adjustments should be implemented.

The second routine (514) may be implemented if a target pump unit speed is greater than a current pump unit speed. The routine (514) may include deciding (531) whether to increase (532) speed by a predetermined step or quantity or to increase (533) the speed directly to the target speed. However, if the target speed is greater than a lock-up speed threshold, the controller 310 may adjust (537) the speed to the luck-up threshold. When the lock-up speed is reached, the controller 310 may again decide (531) how to reach the target speed. If the current speed plus the speed of the predetermined step is less than the target speed, than the controller 310 may increase (532) the speed by the predetermined step. The controller 310 may then wait (534) for the pump unit 200 to reach the stepped-up speed. If the target speed was not reached, then the controller 310 may again decide (531) how to reach the target speed. If the current speed plus the speed of the predetermined step is greater than the target speed, than the controller 310 may increase (533) the speed of the pump unit to the target speed. The controller 310 may then wait (535) for the pump unit 200 to reach the target speed. When the target speed is reached, the controller 310 may wait (536) for the transmission to lock-up. Once the transmission is locked-up, the controller 310 may continue to operate the pump unit 200 until new operation set-points are entered (505).

The third routine (516) may be implemented if the target transmission gear is less than the current transmission gear. The routine (516) may include throttling down (541) such that the transmission 262 can be unlocked to disconnect the prime mover 204 from the pump 202. The controller 310 may wait (542) for the transmission 262 to be unlocked. If the transmission 262 failed to unlock, such failure may be communicated to the controller 310, which may than wait (505) for another operation set-point. If the transmission 262 was successfully unlocked, the controller 310 may cause the transmission to set (543) the target gear and wait (544) for the transmission 262 to shift to the target gear. If the transmission 262 failed to shift gears, such failure may be communicated to the controller 310, which may than wait (505) for another operation set-point. If the target gear was achieved, the controller 310 may compare the speed of the pump unit 200 to decide (510) if additional gear and/or speed adjustments should be implemented. Furthermore, instead of waiting (542) for the transmission 262 to be unlocked, the controller 310 may wait (545) for a predetermined period of time to set (543) the target gear.

The fourth routine (518) may be implemented if the target pump unit speed is less than the current pump unit speed. The routine (518) may include decreasing (551) the speed of the pump unit 200 to the target speed. The controller 310 may then wait (552) for the pump unit 200 to achieve the target speed. When the target speed is reached, the controller 310 may wait (553) for the transmission to lock-up. Once the transmission is locked-up, the controller 310 may continue to operate the pump unit 200 until new operation set-points are entered (505).

Figure 15:
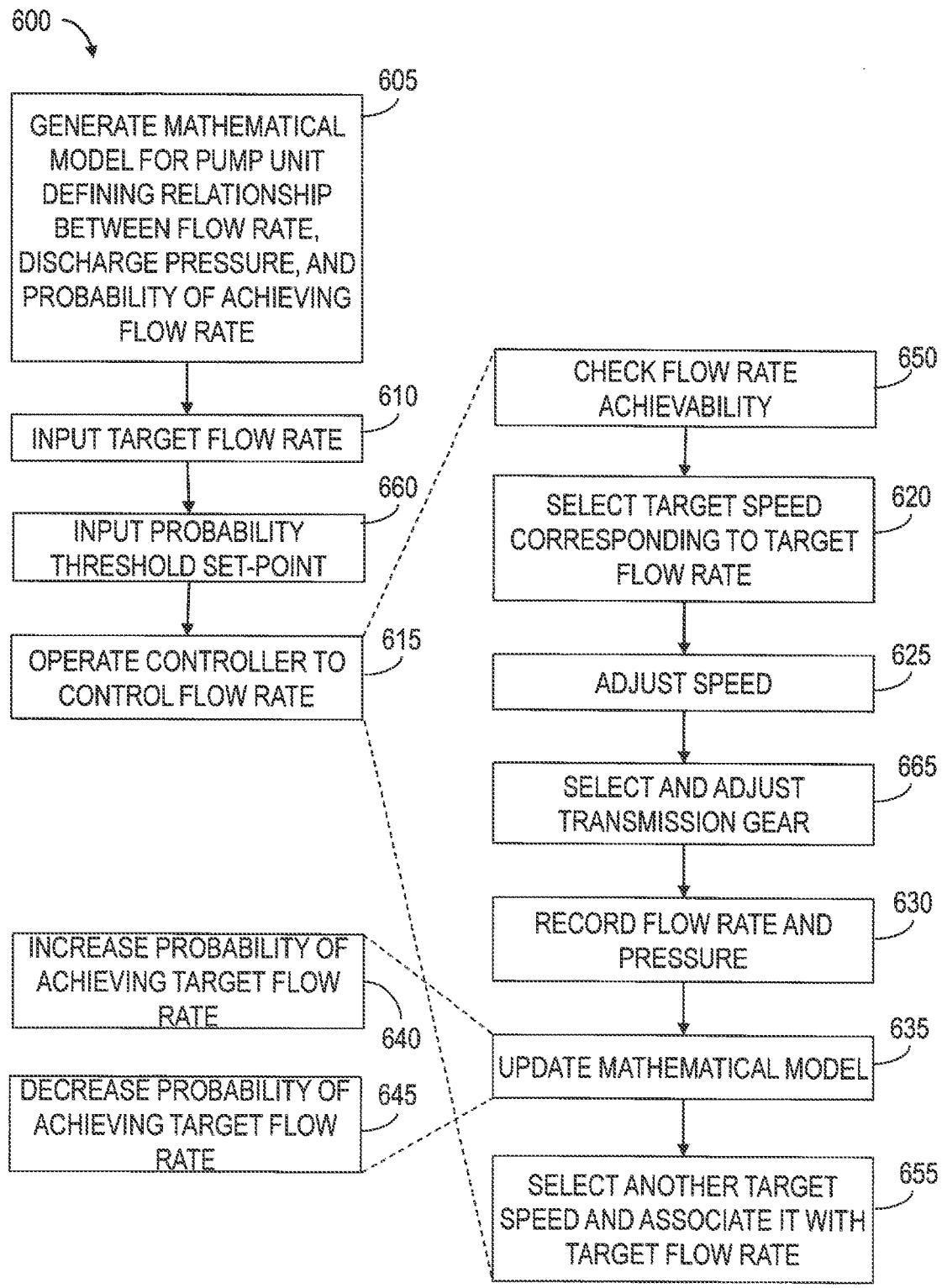
FIG. 15 is a flowchart diagram of at least a portion of an example implementation of a method according to one or more aspects of the present disclosure.

FIG. 15 is a flow-chart diagram of at least a portion of an example implementation of a method (600) according to one or more aspects of the present disclosure. The method (600) may be performed utilizing or otherwise in conjunction with at least a portion of one or more implementations of one or more instances of the apparatus shown in one or more of FIGS. 1-4, the belief model shown in one or more of FIGS. 5-12, the algorithms (400, 500) shown in FIGS. 13 and 14, and/or otherwise within the scope of the present disclosure. For example, the method (600) may be performed and/or caused, at least partially, by the controller 310 executing the coded instructions 332, such as the algorithms (400, 500) according to one or more aspects of the present disclosure. Thus, the following description of the method (600) also refers to apparatus shown in one or more of FIGS. 1-4, the belief model shown in one or more of FIGS. 5-12, and the algorithms (400, 500) shown in FIGS. 13 and 14. However, the method (600) may also be performed in conjunction with implementations of apparatus, belief model, and algorithms other than those depicted in FIGS. 1-14 that are also within the scope of the present disclosure.

The method (600) may comprise generating (605) a mathematical model for a pump unit 200 defining a relationship between a flow rate that is achievable by the pump unit 200 at a corresponding discharge pressure and a probability of achieving the flow rate at the corresponding discharge pressure. The method (600) may further comprise inputting (610) a target flow rate into a controller 310 comprising a processor 312 and a memory 317 including computer program code 332, and operating (615) the controller 310 to automatically control flow rate of the pump unit 200. Operating (615) the controller 310 may include automatically selecting (620) a target pump unit speed corresponding to the target flow rate, adjusting (625) speed of the pump unit 200 until the target pump unit speed is achieved, recording (630) actual flow rate and actual discharge pressure of the pump unit, and updating (635) the mathematical model. Updating (635) the mathematical model may be performed by increasing (640) the probability of achieving the target flow rate by the pump unit 200 if the recorded actual flow rate is not less than the target flow rate, and decreasing (645) the probability of achieving the target flow rate by the pump unit 200 if the recorded actual flow rate is less than the target flow rate.

The mathematical model for the pump unit 200 may be initially based on flow rate and discharge pressure performance specifications of the pump unit 200. Each point along the mathematical model may be associated with a speed of the pump unit 200 and a transmission gear of a transmission 262. The probability of the mathematical model may increase as the flow rate that is achievable by the pump unit 200 increases. The probability of the mathematical model may increase as the discharge pressure of the pump unit 200 decreases.

The method (600) may further comprise checking (650) target flow rate achievability before selecting (620) the target speed. Checking (650) the target flow rate achievability may include before selecting (620) the target pump unit speed corresponding to the target flow rate, determining if the target flow rate is within the mathematical model. If the target flow rate is within the mathematical model, the target pump unit speed may be a first target pump unit speed and the target flow rate may be a first target flow rate. However, if the target flow rate is outside of the mathematical model, checking (650) the target flow rate achievability may comprise operating the controller 310 by selecting a second target pump unit speed corresponding to a second target flow rate, wherein the second target pump unit speed is less than the first target pump unit speed, and wherein the second target flow rate is less than the first target flow rate, adjusting speed of the pump unit 200 until the second target pump unit speed is achieved, recording actual flow rate and actual discharge pressure of the pump unit 200, and updating the mathematical model. Updating the mathematical model may include increasing the probability of achieving the second target flow rate by the pump unit 200 if the recorded actual flow rate is not less than the second target flow rate, and decreasing the probability of achieving the second target flow rate by the pump unit 200 if the recorded actual flow rate is less than the second target flow rate.

The method (600) may further comprise selecting (655) another target speed and associating such target speed with the target flow rate. Selecting (655) another target speed may include operating the controller 310 by selecting a second target pump unit speed, wherein the second target pump unit speed is greater than the first target pump unit speed, adjusting speed of the pump unit 200 until the second target pump unit speed is achieved, recording actual flow rate and actual discharge pressure of the pump unit 200, and updating the mathematical model. The mathematical model may be updated by increasing the probability of achieving the target flow rate by the pump unit 200 if the recorded actual flow rate is not less than the target flow rate, and associating the second target pump unit speed with the target flow rate.

The method (600) further comprises inputting (660) a probability threshold set-point, and wherein selecting (620) the target pump unit speed comprises selecting a pump unit speed corresponding to a flow rate having a probability to be achieved that is substantially equal to the probability threshold set-point. Also, selecting (620) the target pump unit speed corresponding to the target flow rate may be based on a probability threshold set-point which may limit the target pump unit speed to a pump unit speed corresponding to a flow rate having a probability that is riot less than the probability threshold set-point.

The pump unit 200 may comprise a prime mover 204 operatively connected with a fluid pump 202 via a transmission 262, wherein operating the controller 310 to automatically control the flow rate of the pump unit 200 may further comprise selecting (665) a target transmission gear that corresponds to the target flow rate and adjusting transmission gears until the target transmission gear is achieved.

In view of the entirety of the present disclosure, including the figures and the claims, a person having ordinary skill in the art will readily recognize that the present disclosure introduces an apparatus comprising a controller having a processor and a memory including computer program code, wherein the controller is operable to automatically control flow rate discharged by a pump unit by: (A) controlling speed of the pump unit to achieve a target speed based on a flow rate set-point and an interrelationship between: (i) flow rate achievable by the pump unit; (ii) discharge pressure of the pump unit; and (iii) probability of achieving the flow rate at a corresponding discharge pressure; and (B) at least while the target speed is achieved: (i) increasing the probability of achieving the flow rate set-point when actual flow rate of the pump unit is not less than the flow rate set-point; and (ii) decreasing the probability of achieving the flow rate set-point when the actual flow rate of the pump unit is less than the flow rate set-point.

The controller may be operable to generate a mathematical belief model characterizing the interrelationship. The controller may be operable to generate the mathematical belief model based partly on predetermined flow rate and pressure specifications of the pump unit.

The apparatus may further comprise the pump unit. The pump unit may comprise a pump at least indirectly driven by a prime mover, and the actual flow rate may be of fluid that is pressurized and discharged by the pump.

Controlling the speed of the pump unit to achieve the target speed may be further based on a probability threshold set-point that limits the actual flow rate of the pump unit to a flow rate having a probability that is within the probability threshold.

The present disclosure also introduces a method comprising: (A) generating a mathematical belief model for maintaining an interrelationship between: (i) flow rate achievable by a pump unit; (ii) discharge pressure of the pump unit; and (iii) probability of achieving the flow rate at a corresponding discharge pressure; and (B) operating a controller comprising a processor and a memory including computer program code to automatically control flow rate discharged by the pump unit by: (i) controlling speed of the pump unit to achieve a target speed based on a flow rate set-point and the mathematical belief model; and (ii) updating the mathematical belief model at least while the target speed is achieved by: (a) increasing the probability of achieving the flow rate set-point when actual flow rate of the pump unit is not less than the flow rate set-point; and (b) decreasing the probability of achieving the flow rate set-point when the actual flow rate of the pump unit is less than the flow rate set-point.

Generating the mathematical belief model may be based partly on predetermined flow rate and pressure specifications of the pump unit.

Generating the mathematical belief model may be performed by the controller.

The method may further comprise inputting the mathematical belief model into the controller.

Each point along the mathematical belief model may be associated with a speed of the pump unit and a gear of a transmission that are collectively operable to produce the flow rate at the corresponding discharge pressure.

The pump unit may comprise a prime mover operatively connected with a fluid pump via a transmission, and controlling the speed of the pump unit may comprise: determining a target transmission gear to achieve the target speed; and adjusting gears of the transmission until the target transmission gear is achieved.

The probability of the mathematical belief model may increase as the flow rate that is achievable by the pump unit decreases.

The probability of the mathematical belief model may increase as the discharge pressure of the pump unit decreases.

Controlling the speed of the pump unit to achieve the target speed may be further based on a probability threshold set-point that limits the actual flow rate of the pump unit to a flow rate having a probability that is within the probability threshold.

The present disclosure also introduces a method comprising: (A) generating a mathematical model for a pump unit defining a relationship between a flow rate that is achievable by the pump unit at a corresponding discharge pressure and a probability of achieving the flow rate at the corresponding discharge pressure; (B) inputting a target flow rate into a controller comprising a processor and a memory including computer program code; and (C) operating the controller to automatically control flow rate of the pump unit by automatically: (i) selecting a target pump unit speed corresponding to the target flow rate; (ii) adjusting speed of the pump unit until the target pump unit speed is achieved; (iii) recording actual flow rate and actual discharge pressure of the pump unit; and (iv) updating the mathematical model by: (a) increasing the probability of achieving the target flow rate by the pump unit if the recorded actual flow rate is not less than the target flow rate; and (b) decreasing the probability of achieving the target flow rate by the pump unit if the recorded actual flow rate is less than the target flow rate.

The mathematical model for the pump unit may be initially based on flow rate and discharge pressure performance specifications of the pump unit.

Each point along the mathematical model may be associated with a speed of the pump unit and a transmission gear of a transmission.

The probability ref the mathematical model may increase as the flow rate that is achievable by the pump unit increases.

The probability of the mathematical model may increase as the discharge pressure of the pump unit decreases.

Operating the controller to automatically control the flow rate of the pump unit may further comprise, before selecting the target pump unit speed corresponding to the target flow rate: (A) determining if the target flow rate is within the mathematical model; and (B1) if the target flow rate is within the mathematical model, the target pump unit speed is a first target pump unit speed and the target flow rate is a first target flow rate; or (B2) if the target flow rate is outside of the mathematical model, operating the controller further comprises automatically: (i) selecting a second target pump unit speed corresponding to a second target flow rate, wherein the second target pump unit speed is less than the first target pump emit speed, and Wherein the second target flow rate is less than the first target flow rate; (ii) adjusting speed of the pump unit until the second target pump unit speed is achieved; (iii) recording actual flow rate and actual discharge pressure of the pump unit; and (iv) updating the mathematical model by: (a) increasing the probability of achieving the second target flow rate by the pump unit if the recorded actual flow rate is not less than the second target flow rate; and (b) decreasing the probability of achieving the second target flow rate by the pump unit if the recorded actual flow rate is less than the second target flow rate.

The target pump unit speed may be a first target pump unit speed, and if the recorded flow rate is less than the target flow rate, operating the controller may further comprise automatically: (A) selecting a second target pump unit speed, wherein the second target pump unit speed is greater than the first target pump unit speed; (B) adjusting speed of the pump unit until the second target pump unit speed is achieved; (C) recording actual flow rate and actual discharge pressure of the pump unit; and (D) updating the mathematical model by: (i) increasing the probability of achieving the target flow rate by the pump unit if the recorded actual flow rate is not less than the target flow rate; and (ii) associating the second target pump unit speed with the target flow rate.

The method may further comprise inputting a probability threshold set-point, and selecting the target pump unit speed may comprise selecting a pump unit speed corresponding to a flow rate having a probability to be achieved that is substantially equal the probability threshold set-point.

Selecting the target pump unit speed corresponding to the target flow rate may be further based on a probability threshold set-point that limits the target pump unit speed to a pump unit speed corresponding to a flow rate having a probability that is not less than, the probability threshold set-point.

The pump unit may comprise a prime mover operatively connected with a fluid pump via a transmission, and operating the controller to automatically control the flow rate of the pump unit may further comprise: selecting a target transmission gear that corresponds to the target flow rate; and adjusting transmission gears until the target transmission gear is achieved.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the embodiments introduced herein. A person having ordinary skill in the art should also realize that such equivalent constructions do not depart from the scope of the present disclosure, and that they may make various changes, substitutions and alterations herein without departing from the spirit and scope of the present disclosure.

The Abstract at the end of this disclosure is provided to allow the reader to quickly ascertain the nature of the technical disclosure. It is submitted with the understanding that it will not be used to interpret or limit the scope or meaning of the claims.

What is claimed is:

1. An apparatus comprising:
a controller comprising a processor and a memory including computer program code,
wherein the controller is operable to automatically control flow rate discharged by a pump unit by:
controlling speed of the pump unit to achieve a target speed based on a flow rate set-point and an interrelationship between:
flow rate achievable by the pump unit;
discharge pressure of the pump unit; and
probability of achieving the flow rate at a corresponding discharge pressure; and
at least while the target speed is achieved:
increasing the probability of achieving the flow rate set-point when actual flow rate of the pump unit is not less than the flow rate set-point; and
decreasing the probability of achieving the flow rate set-point when the actual flow rate of the pump unit is less than the flow rate set-point.

2. The apparatus of claim 1 wherein the controller is further operable to generate a mathematical belief model characterizing the interrelationship.

3. The apparatus of claim 2 wherein the controller is operable to generate the mathematical belief model based partly on predetermined flow rate and pressure specifications of the pump unit.

4. The apparatus of claim 1 further comprising the pump unit.

5. The apparatus of claim 4 wherein the pump unit comprises a pump at least indirectly driven by a prime mover, and wherein the actual flow rate is of fluid that is pressurized and discharged by the pump.

6. The apparatus of claim 1 wherein controlling the speed of the pump unit to achieve the target speed is further based on a probability threshold set-point which limits the actual flow rate of the pump unit to a flow rate having a probability that is within the probability threshold.

7. A method comprising:
generating a mathematical belief model for maintaining an interrelationship between:
flow rate achievable by a pump unit;
discharge pressure of the pump unit; and
probability of achieving the flow rate at a corresponding discharge pressure; and operating a controller comprising a processor and a memory including computer program code to automatically control flow rate discharged by the pump unit by:
controlling speed of the pump unit to achieve a target speed based on a flow rate set-point and the mathematical belief model; and
updating the mathematical belief model at least while the target speed is achieved by:
increasing the probability of achieving the flow rate set-point when actual flow rate of the pump unit is not less than the flow rate set-point; and
decreasing the probability of achieving the flow rate set-point when the actual flow rate of the pump unit is less than the flow rate set-point.

8. The method of claim 7 wherein generating the mathematical belief model is based partly on predetermined flow rate and pressure specifications of the pump unit.

9. The method of claim 7 further comprising inputting the mathematical belief model into the controller.

10. The method of claim 7 wherein generating the mathematical belief model is performed by the controller.

11. The method of claim 7 wherein each point along the mathematical belief model is associated with a speed of the pump unit and a gear of a transmission that are collectively operable to produce the flow rate at the corresponding discharge pressure.

12. The method of claim 7 wherein the pump unit comprises a prime mover operatively connected with a fluid pump via a transmission, and wherein controlling the speed of the pump unit comprises:
determining a target transmission gear to achieve the target speed; and
adjusting gears of the transmission until the target transmission gear is achieved.

13. The method of claim 7 wherein the probability of the mathematical belief model increases as the flow rate that is achievable by the pump unit decreases.

14. The method of claim 7 wherein the probability of the mathematical belief model increases as the discharge pressure of the pump unit decreases.

15. The method of claim 7 wherein controlling the speed of the pump unit to achieve the target speed is further based on a probability threshold set-point which limits the actual flow rate of the pump unit to a flow rate having a probability that is within the probability threshold.

16. A method comprising:
generating a mathematical model for a pump unit defining a relationship between a flow rate that is achievable by the pump unit at a corresponding discharge pressure and a probability of achieving the flow rate at the corresponding discharge pressure;
inputting a target flow rate into a controller comprising a processor and a memory including computer program code; and
operating the controller to automatically control flow rate of the pump unit by automatically:
selecting a target pump unit speed corresponding to the target flow rate;
adjusting speed of the pump unit until the target pump unit speed is achieved;
recording actual flow rate and actual discharge pressure of the pump unit; and
updating the mathematical model by:
increasing the probability of achieving the target flow rate by the pump unit if the recorded actual flow rate is not less than the target flow rate; and
decreasing the probability of achieving the target flow rate by the pump unit if the recorded actual flow rate is less than the target flow rate.

17. The method of claim 16 wherein the mathematical model for the pump unit is initially based on flow rate and discharge pressure performance specifications of the pump unit.

18. The method of claim 16 wherein each point along the mathematical model is associated with a speed of the pump unit and a transmission gear of a transmission.

19. The method of claim 16 wherein the probability of the mathematical model increases as the flow rate that is achievable by the pump unit increases.

20. The method of claim 16 wherein the probability of the mathematical model increases as the discharge pressure of the pump unit decreases.

21. The method of claim 16 wherein operating the controller to automatically control the flow rate of the pump unit further comprises, before selecting the target pump unit speed corresponding to the target flow rate:
determining if the target flow rate is within the mathematical model; and
if the target flow rate is within the mathematical model, the target pump unit speed is a first target pump unit speed and the target flow rate is a first target flow rate; or
if the target flow rate is outside of the mathematical model, operating the controller further comprises automatically:
selecting a second target pump unit speed corresponding to a second target flow rate, wherein the second target pump unit speed is less than the first target pump unit speed, and wherein the second target flow rate is less than the first target flow rate;
adjusting speed of the pump unit until the second target pump unit speed is achieved;
recording actual flow rate and actual discharge pressure of the pump unit; and
updating the mathematical model by:
increasing the probability of achieving the second target flow rate by the pump unit if the recorded actual flow rate is not less than the second target flow rate; and
decreasing the probability of achieving the second target flow rate by the pump unit if the recorded actual flow rate is less than the second target flow rate.

22. The method of claim 16 wherein the target pump unit speed is a first target pump unit speed, and wherein, if the recorded flow rate is less than the target flow rate, operating the controller further comprises automatically:
selecting a second target pump unit speed, wherein the second target pump unit speed is greater than the first target pump unit speed;
adjusting speed of the pump unit until the second target pump unit speed is achieved;
recording actual flow rate and actual discharge pressure of the pump unit; and
updating the mathematical model by:
increasing the probability of achieving the target flow rate by the pump unit if the recorded actual flow rate is not less than the target flow rate; and
associating the second target pump unit speed with the target flow rate.

23. The method of claim 16 further comprising inputting a probability threshold set-point, wherein selecting the target pump unit speed comprises selecting a pump unit speed corresponding to a flow rate having a probability to be achieved that is substantially equal to the probability threshold set-point.

24. The method of claim 16 wherein selecting the target pump unit speed corresponding to the target flow rate is further based on a probability threshold set-point which limits the target pump unit speed to a pump unit speed corresponding to a flow rate having a probability that is not less than the probability threshold set-point.

25. The method of claim 16 wherein the pump unit comprises
   a prime mover operatively connected with a fluid pump via transmission, and
   wherein operating the controller to automatically control the flow rate of the pump unit further comprises:
      selecting a target transmission gear that corresponds to the target flow rate; and
      adjusting transmission gears until the target transmission gear is achieved.

* * * * *